United States Patent [19]
Matsunari et al.

[11] Patent Number: 5,495,430
[45] Date of Patent: Feb. 27, 1996

[54] PROCESS TIME ESTIMATING APPARATUS

[75] Inventors: Fumio Matsunari; Kazutaka Ogo, both of Nagoya; Tadayuki Abe, Okazaki; Masayuki Asai, Toyoake, all of Japan

[73] Assignees: Kabushiki Kaisha Toyota Chuo Kenkyusho, Aichi; Toyota Jidosha Kabushiki Kaisha, Toyota, both of Japan

[21] Appl. No.: 989,559

[22] Filed: Dec. 11, 1992

[30] Foreign Application Priority Data

Dec. 13, 1991 [JP] Japan .................................. 3-351342

[51] Int. Cl.$^6$ .............................. G06F 17/18; G06G 7/52
[52] U.S. Cl. .......................... 364/578; 395/22; 395/904; 364/401; 364/468
[58] Field of Search .................................. 364/578, 569, 364/148, 468, 401, 402; 395/22, 904, 906

[56] References Cited

U.S. PATENT DOCUMENTS

| | | | |
|---|---|---|---|
| 4,648,023 | 3/1987 | Powell | 364/401 |
| 4,852,001 | 7/1989 | Tsushima et al. | 364/401 |
| 4,887,218 | 12/1989 | Natarajan | 364/468 |
| 4,937,743 | 6/1990 | Rassman et al. | 364/401 |
| 4,994,980 | 2/1991 | Lee et al. | 395/904 |
| 5,053,970 | 10/1991 | Kurihara et al. | 395/904 |
| 5,111,531 | 5/1992 | Grayson et al. | 395/22 |
| 5,148,370 | 9/1992 | Litt et al. | 395/906 |
| 5,167,009 | 11/1992 | Skeirik | 395/22 |
| 5,231,567 | 7/1993 | Matoba et al. | 364/468 |
| 5,307,260 | 4/1994 | Watanabe et al. | 395/22 |

FOREIGN PATENT DOCUMENTS

| | | |
|---|---|---|
| 2-100822 | 4/1990 | Japan . |
| 2-309447 | 12/1990 | Japan . |
| 2-310703 | 12/1990 | Japan . |
| 3-5802 | 1/1991 | Japan . |

OTHER PUBLICATIONS

Halbert White, "Neural–Network Learning and Statistics", Al Expert, Dec. 1989, pp. 48–52.

*Primary Examiner*—Ellis B. Ramirez
*Assistant Examiner*—Eric W. Stamber
*Attorney, Agent, or Firm*—Burns, Doane, Swecker & Mathis

[57] ABSTRACT

A process time estimating apparatus is disclosed for estimating the process time for manufacturing an object such as a metal die. The apparatus includes a process time estimating section, a process occupancy time measurement section and a process program scheduling section. The process time estimating section includes a neural network device as an estimating device. An estimation input factor extracting section extracts input factors such as drawing information for an object to be manufactured. A storing section stores input factors for later neural network learning to improve the estimation capability of the system. The process occupancy time measurement section reads the process code and automatically measures the actual time involved in performing the process for a particular object being manufactured. A selecting section selects a measured process time for neural network learning. The process program scheduling section receives output information from the time measurement section and stores time estimates which are compared with actual process times for selecting a measured process time for further neural network learning.

21 Claims, 30 Drawing Sheets

FIG. 7

| | ESTIMATION TIME (hr) | | | | ACTUAL TIME (hr) |
|---|---|---|---|---|---|
| | MR.A | MR.B | MR.C | MR.D | |
| HOLES FOR INSERT 1 | 4.0 (1.6) | 3.0 (1.2) | 4.0 (1.6) | 2.0 (0.8) | 2.5 |
| 2 | 4.0 (0.8) | 8.0 (1.5) | 8.0 (1.5) | 4.0 (0.8) | 5.3 |
| 3 | 6.0 (1.3) | 1.5 (0.3) | 1.2 (0.3) | 6.0 (1.3) | 4.5 |
| 4 | 3.0 (0.8) | 3.0 (0.8) | 6.0 (1.5) | 5.0 (1.3) | 4.0 |
| 5 | 2.0 (0.8) | 0.5 (0.2) | 3.0 (1.2) | 3.0 (1.2) | 2.5 |
| 6 | 2.0 (0.4) | 3.0 (0.5) | 6.0 (1.0) | 4.0 (0.7) | 5.8 |
| 7 | 3.0 (1.0) | 4.0 (1.3) | 3.0 (1.0) | 3.0 (1.0) | 3.0 |

FIGURES IN BRACKETS INDICATE
(ESTIMATED TIME)/(ACTUAL TIME)

| PRODUCT NAME | INSTRUMENT PANEL-UPPER | | | MODEL NO. | AAQ-35 | METAL DIE NAME | MOVABLE DIE | | | |
|---|---|---|---|---|---|---|---|---|---|---|
| PROCESS NUMBER | SCHDULING PRACTICING TIME | MACHINE TOOL IN USE | MACHINED SURFACE | PROCESSING CONTENTS | | | PRACTI-CING DATE | PRACTI-CING PERSONNEL | QUALITY CHECK |
| 1 | | | 1 → 6 | DRILLING PROCESS(GUN DRILL), DRILLING 187 LUBRICATION OIL/COOLING WATER CONDUIT HOLES | | | | | |
| 2 | | | 4 | MILLING PROCESS ROUGH MACHINING OF PRODUCT SURFACE | | | | | |
| 3 | | | 3 | BORING PROCESS FORMING REFERENCE SURFACE | | | | | |
| | | | 4 | FORMING SUB-REFERENCE PLANE FORMING A PRESSED SURFACE FORMING A HOLE FOR INSERT A FORMING A HOLE FOR INSERT B FORMING A SLIDE CORE | | | | | |
| 4 | | | 1 | BORING PROCESS FORMING REFERENCE PLANE FORMING A SLIDE 8° SURFACE FORMING A SLIDE 15° SURFACE FORMING A GATE SECTION | | | | | |
| 5 | | | 4 | MILLING PROCESS MEDIUM PRODUCT FINISHING MACHINING FINISHING PRODUCT MACHINING | | | | | |

FIG. 14

211 — PROCESS TIME ESTIMATING DRAWING INFORMATION ITEM STORAGE SECTION

| DRILLING PROCESS | MILLING PROCESS | BORING PROCESS |
|---|---|---|
| NUMBER OF KINDS AND TIMES OF GUN DRILL PROCESSING AND OVERALL PROCESSING LENGTH NUMBER OF KINDS AND TIMES OF TILTED GUN DRILL PROCESSING AND OVERALL PROCESSING LENGTH NUMBER OF KINDS AND TIMES OF SPOT FACING OPERATIONS AND OVERALL SPOT FACING LENGTH NUMBER OF KINDS AND TIMES OF TAPPING AND OVERALL TAPPING LENGTH NUMBER OF KINDS AND TIMES TILTED TAPPING OVERALL TAPPING LENGTH NUMBER OF TIMES OF PROCESSING REFERENCE PIN REAMER, NUMBER OF KINDS AND TIMES OF REAMER PROCESSING OPERATIONS AND OVERALL REAMING LENGTH NUMBER OF KINDS AND TIMES OF TILTED REAMER OPERATIONS AND OVERALL REAMING LENGTH NUMBER OF TIMES OF PIN REAMER OPERATIONS FOR EXTRUSION CORE NUMBER OF TIMES OF PIN REAMER OPERATIONS FOR CORE EXTRACTION NUMBER OF KINDS AND TIMES OF TILTED DRILLING AND OVERALL DRILLING LENGTH ALTERNATIVELY, THE NAME OF THE FUNCTIONS OF THE HOLES, THE NUMBER OF TIMES OF MACHINING OPERATIONS AND MACHINING LENGTH | PROCESSING METHOD AND STEP AREA OF PARTING SECTION=(TRANSVERSE LENGTH OF FLAT AREA+LENGTH OF PARTING SECTION)×2 OR (VERTICAL WALL) ×(WIDTH OF PARTING SECTION+LONGITUDINAL LENGTH OF UPPER VERTICAL WALL+LONGITUDINAL LENGTH OF LOWER VERTICAL WALL)×(WIDTH OF PARTING SECTION)×2 OR (TRANSVERSE LENGTH OF FLAT AREA +TRANSVERSE LENGTH OF SIDE VERTICAL WALL+ LONGITUDINAL LENGTH OF UPPER VERTICAL WALL+LONGITUDINAL LENGTH OF LOWER VERTICAL WALL)×(WIDTH OF PARTING SECTION)×2+TOTAL PERIPHERY OF A GAP AREA IN PRODUCT SECTION)×(WIDTH OF PARTING SECTION) AREA OF COTTER SECTION=(TRANSVERSE LENGTH OF FLAT AREA+TRANSVERSE LENGTH OF SIDE VERTICAL WALL)×(CONSTANT)×2 OR (LONGITUDINAL LENGTH OF FLAT SECTION+LONGITUDINAL LENGTH OF UPPER VERTICAL WALL+LONGITUDINAL LENGTH OF LOWER VERTICAL WALL)×(CONSTANT)×2 OR TRANSVERSE LENGTH OR FLAT AREA+TRANSVERSE LENGTH OF SIDE VERTICAL WALL+LONGITUDINAL LENGTH OF FLAT AREA +VERTICAL LENGTH OF UPPER VERTICAL WALL+ LONGITUDINAL LENGTH OF LOWER VERTICAL WALL) ×(CONSTANT)×2 ROUGH AND MEDIUM FINISHING MACHINING AREA OF FLAT PART,UPPER VERTICAL WALL, LOWER VERTICAL WALL AND SIDE VERTICAL WALL FINISHING AND SUPER-FINISHING MACHINING | NUMBER OF KINDS OF PROCESSING REFERENCE SURFACES,TOTAL NUMBER OF TIMES OF MACHINING AND TOTAL MACHINING AREA; NUMBER OF KINDS OF SLIDING SURFACES;TOTAL NUMBER OF TIMES OF MACHINING AND TOTAL MACHINING AREA; NUMBER OF TIMES OF MACHINING AND THE TOTAL MACHINING AREA; NUMBER OF TIMES OF MACHINING OF PRESSED SURFACES AND TOTAL MACHINING AREA; NUMBER OF TIMES OF MACHINING OF GENERAL SURFACES AND TOTAL MACHINING AREA; NUMBER OF KINDS OF SQUARE INSERT(CORE)HOLES, TOTAL NUMBER OF TIMES OF MACHINING AND TOTAL MACHINING AREA; NUMBER OF TIMES OF MACHINING OF CIRCULAR HOLES FOR INSERT(CORE)PINS,TOTAL NUMBER OF MACHINING OPERATIONS AND TOTAL MACHINING AREA; NUMBER OF TIMES OF MACHINING OF ELLIPTICAL HOLES FOR NEST(CORE)PINS AND TOTAL MACHINING AREA; NUMBER OF KINDS OF GROOVE CUTTING,TOTAL NUMBER OF CUTTING AND TOTAL CUTTING AREA; NUMBER OF TIMES OF MACHINING OF HOLES FOR CIRCULAR CORES AND TOTAL MACHINING AREA; NUMBER OF TIMES OF MACHINING OF SLIDE CORES AND TOTAL MACHINING AREA; NUMBER OF TIMES OF MACHINING OF HOLES SOR EXTRUSION (EXTRACTION)CORES AND TOTAL MACHINING AREA; NUMBER OF TIMES OF MACHINING OF HOLES FOR EXTRUSION (EXTRACTION) TILT CORES AND TOTAL MACHINING AREA; |

LONGITUDINAL LENGTH OF FLAT PART(TRANSVERSE LENGTH OF FLAT PART, AREA OF FLAT PART, NUMBER OF FLUTES IN FLAT AREA, OVERALL LENGTH OF FLUTES IN FLAT AREA, OVERALL LENGTH OF FLUTES IN FLAT AREA, HEIGHT OF VERTICAL WALL IN FLAT PART,(LONGITUDINAL TRANS-VERSE)LENGTH OF FLAT PART, LONGITUDINAL LENGTH OF UPPER VERTICAL WALL/TRANSVERSE LENGTH OF UPPER VERTICAL WALL, NUMBER OF FLUTES IN UPPER VERTICAL WALL,OVERALL LENGTH OH FLUTES IN UPPER VERTICAL WALL,(LONGITUDINAL TRANSVERSE)LENGTH OF UPPER VERTICAL WALL,HEIGHT OF VERTICAL WALL IN UPPER VERTICAL WALL/LONGITUDINAL LENGTH OF LOWER VERTICAL WALL,AREA OF LOWER VERTICAL WALL, NUMBER OF FLUTES IN LOWER VERTICAL WALL,OVERALL LENGTH OF FLUTES IN LOWER VERTICAL WALL /LONGITUDINAL LENGTH OF FLAT PART,HEIGHT OF VERTICAL WALL IN LOWER VERTICAL WALL (LONGITUDINAL TRANSVERSE)LENGTH OF LOWER VERTICAL WALL,TRANSVERSE LENGTH OF SIDE VERTICAL WALL,AREA OF SIDE VERTICAL WALL,NUMBER OF FLUTES IN SIDE VERTICAL WALL,OVERALL LENGTH OF FLUTES IN SIDE VERTICAL WALL,(TRANSVERSE)LENGTH OF SIDE VERTICAL WALL LENGTH OF FLAT PART,HEIGHT OF VERTICAL WALL IN SIDE VERTICAL WALL/LONGITUDINAL (TRANSVERSE)LENGTH OF SIDE VERTICAL WALL

FIG. 16

| PRO-CESS | NAME OF MACHINE TOOL USED | DATE | | 1(MON) | 2(TUES) | 3(WED) | ... | 15(MON) | 16(TUES) | 17(WED) | ... | 29(MON) | 30(TUES) | 31(WED) |
|---|---|---|---|---|---|---|---|---|---|---|---|---|---|---|
| DRILLING | MACHINE TOOL A | ESTI-MATION | | PROCESS CODE ① | | | ... | PROCESS CODE ③ | PROCESS CODE ④ | | ... | | | PROCESS CODE ⑦ |
| | | RESULT | | PROCESS CODE ① | | | ... | PROCESS CODE ③ | | | ... | | | |
| | .. | .. | | | | | ... | | | | ... | | | |
| MILLING | MACHINE TOOL J | ESTI-MATION | | PROCESS CODE ⑪ | | | ... | | PROCESS CODE ⑭ | | ... | | | |
| | | RESULT | | PROCESS CODE ⑩ | PROCESS CODE ⑪ | | ... | | | | ... | | | |
| | .. | .. | | | | | ... | | | | ... | | | |
| BORING | MACHINE TOOL P | ESTI-MATION | | PROCESS CODE ⑲ | | | ... | | | | ... | | | |
| | | RESULT | | | | | ... | | | | ... | | | |
| | .. | .. | | | | | ... | | | | ... | | | |

PRODUCT CODE — PRODUCT NAME — MODEL NAME — METAL DIE NUMBER — PROCESS NUMBER

FIG. 17

| PRODUCT NAME | INSTRUMENT PANEL・UPPER | | | | MODEL NO. | AAQ-35 | METAL DIE NAME | MOVABLE DIE | | |
|---|---|---|---|---|---|---|---|---|---|---|
| PROCESS NUMBER | SCHEDULED PRACTICING TIME | MACHINE TOOL IN USE | PROCESS-ING SURFACE | PROCESSING CONTENTS | | | PRACTI-CING DATE | PRACTI-CING PERSONNEL | QUALITY CHECK | |
| 1 | 7/1 → 7/3 | MACHINE TOOL C | 1 → 6 | DRILLING PROCESS(GUN DRILL), DRILLING 187 LUBRICATION OIL/COOLING WATER CONDUIT HOLES | | | | | | |
| 2 | 7/4 → 7/11 | MACHINE TOOL L | 4 | MILLING PROCESS ROUGH MACHINING OF PRODUCT SURFACE | | | | | | |
| 3 | 7/12 → 7/17 | MACHINE TOOL R | 3 4 | BORING PROCESS FORMING REFERENCE SURFACE  FORMING SUB-REFERENCE PLANE FORMING A PRESSED SURFACE FORMING A HOLE FOR INSERT A FORMING A HOLE FOR INSERT B FORMING A SLIDE CORE | | | | | | |
| 4 | 7/18 → 7/23 | MACHINE TOOL S | 1 | BORING PROCESS FORMING A REFERENCE PLANE FORMING A SLIDE 8° SURFACE FORMING A SLIDE 15° SURFACE FORMING A GATE SECTION | | | | | | |
| 5 | 7/24 → 8/8 | MACHINE TOOL M | 4 | MILLING PROCESS MEDIUM PRODUCT FINISHING MACHINING FINISHING PRODUCT MACHINING | | | | | | |

FIG. 18

| PRO-CESS | NAME OF MACHINE TOOL USED | DATE | 1 (MON) | 2 (TUES) | 3 (WED) | ... | 15 (MON) | 16 (TUES) | 17 (WED) | ... | 29 (MON) | 30 (TUES) | 31 (WED) |
|---|---|---|---|---|---|---|---|---|---|---|---|---|---|
| DRIL-LING | MACHINE TOOL A | ESTI-MATION | PROCESS CODE ① | | | ... | | PROCESS CODE ③ | PROCESS CODE ④ | ... | | PROCESS CODE ⑦ | |
| | | RESULT | PROCESS CODE ① | | | ... | | PROCESS CODE ③ | PROCESS CODE ④ | ... | | PROCESS CODE ⑦ | |
| | ... | ... | ... | ... | ... | ... | ... | ... | ... | ... | ... | ... | ... |
| MIL-LING | MACHINE TOOL J | ESTI-MATION | PROCESS CODE ⑪ | | | ... | PROCESS CODE ⑪ | | PROCESS CODE ⑭ | ... | | | | |
| | | RESULT | PROCESS CODE ⑩ | PROCESS CODE ⑪ | | ... | | | PROCESS CODE ⑭ | ... | | | | |
| | ... | ... | ... | ... | ... | ... | ... | ... | ... | ... | ... | ... | ... |
| BOR-ING | MACHINE TOOL P | ESTI-MATION | PROCESS CODE ⑲ | | | ... | | | | ... | | | |
| | | RESULT | PROCESS CODE ⑲ | | | ... | | | | ... | | | |
| | ... | ... | ... | ... | ... | ... | ... | ... | ... | ... | ... | ... | ... |

| PRODUCT CODE | | | |
|---|---|---|---|
| PRODUCT NAME | MODEL NUMBER | METAL DIE NAME | PROCESS NUMBER |

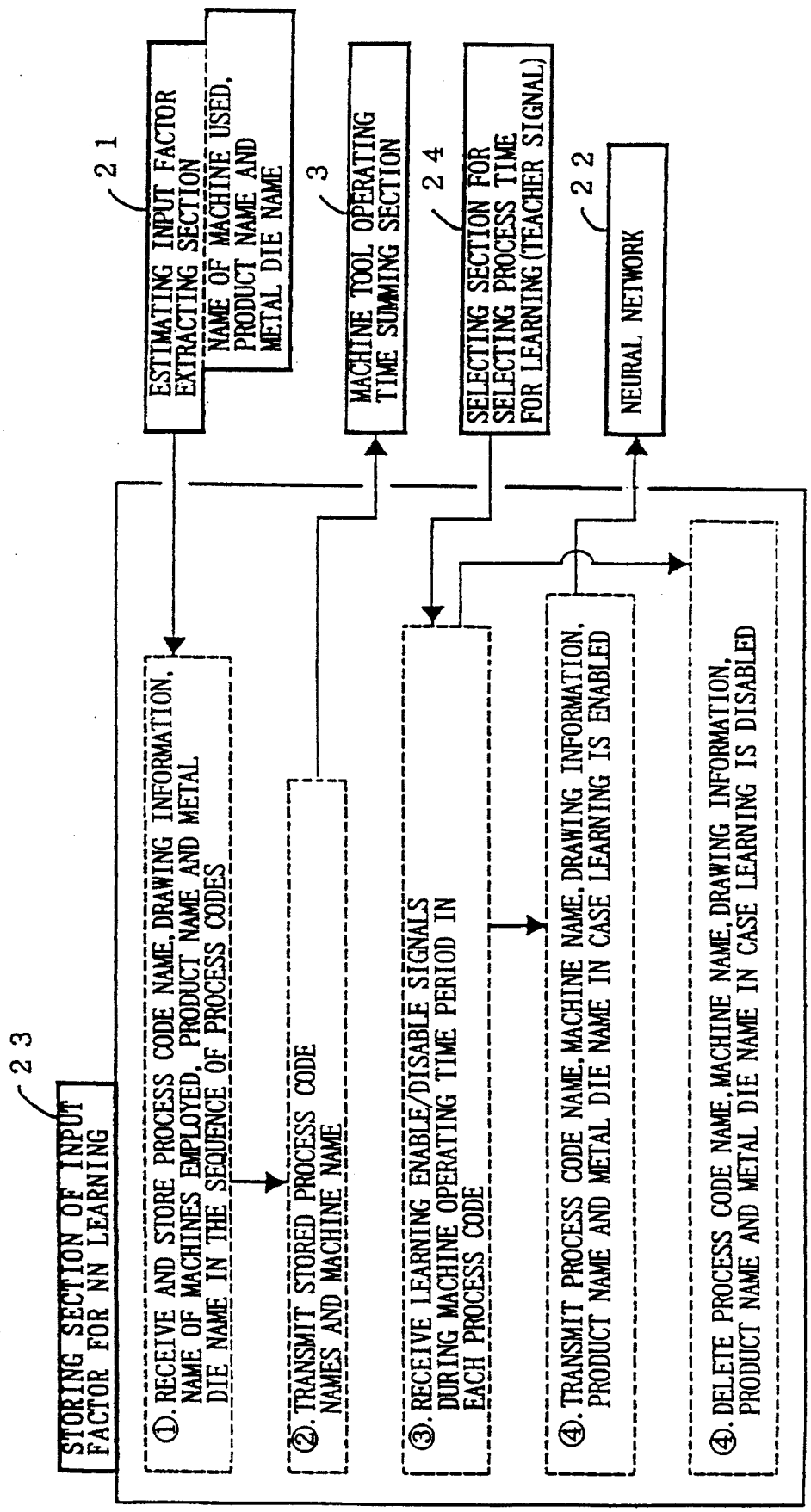

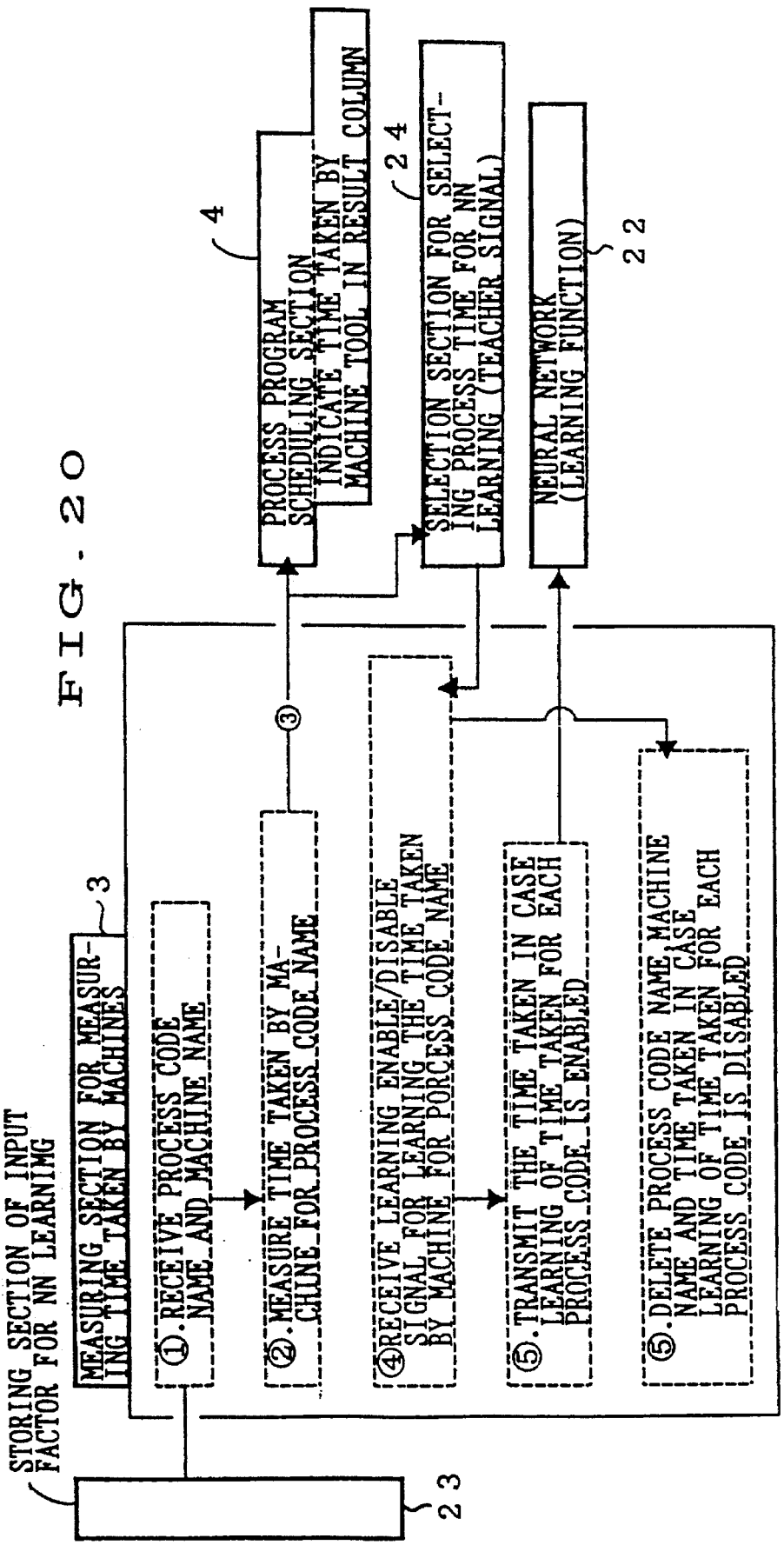

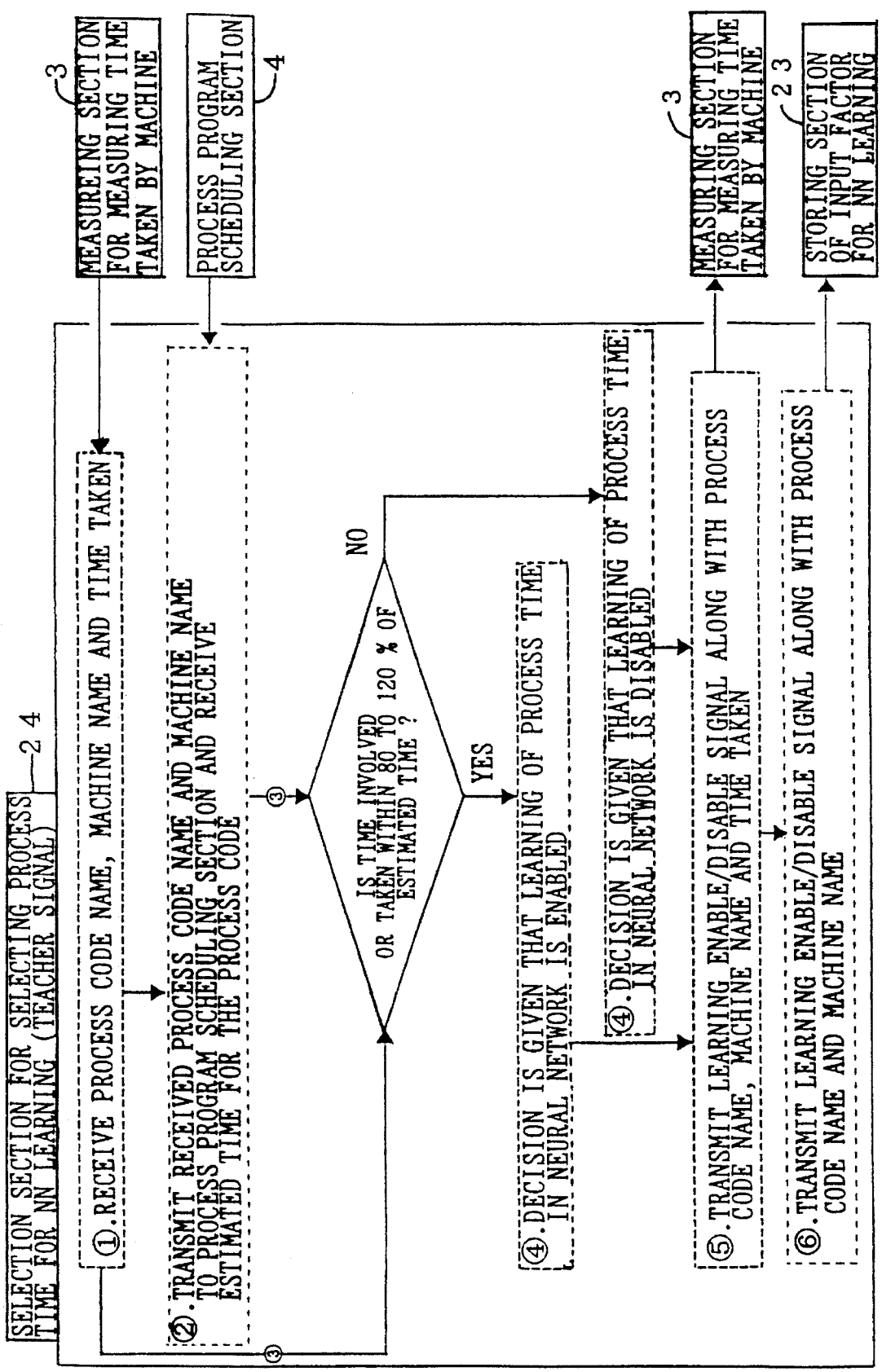

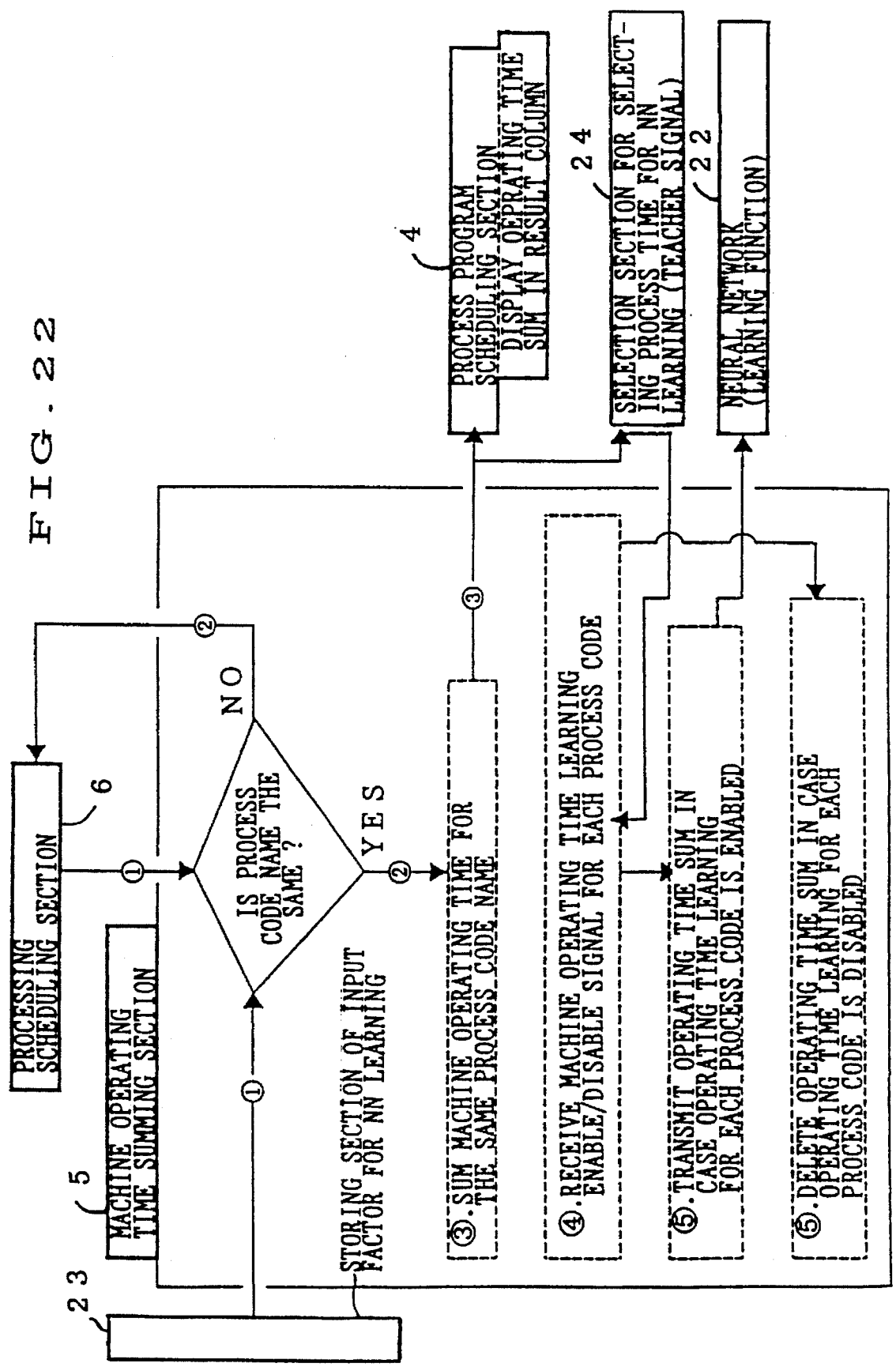

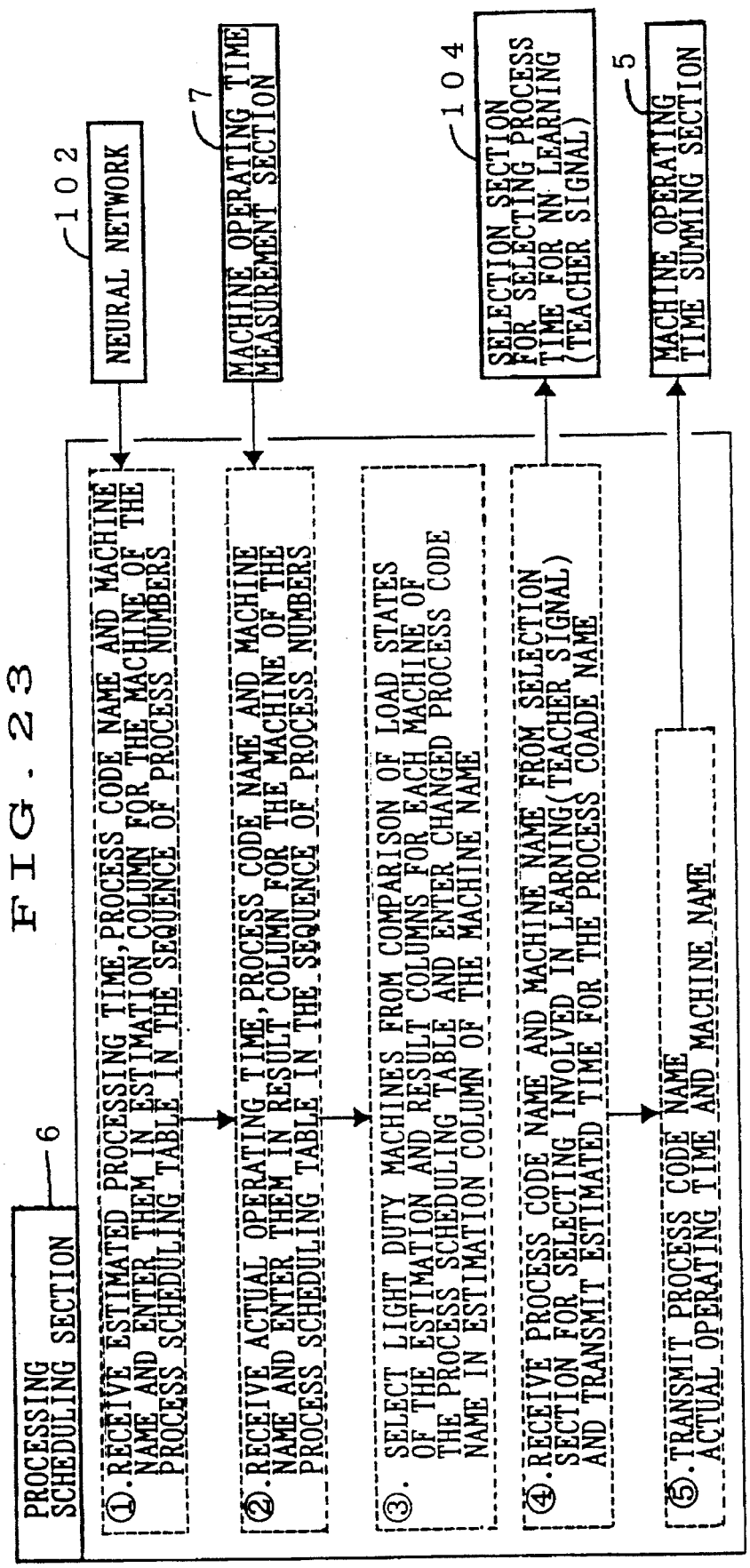

FIG. 24

| PRO-CESS | NAME OF MA-CHINE USED | TIME | 1ST(MON) 8 9 10 11 · · · 23 24 | 2ND(TUES) 1 2 3 4 5 6 7 8 | |
|---|---|---|---|---|---|
| DRILLING | MACHINE TOOL B | ESTIMATION | PROCESS CODE ① · · PROCESS CODE ② | PROCESS CODE ③ PROCESS CODE ④ | |
| | | RESULT | PROCESS CODE ① · PROCESS CODE ② | PROCESS CODE ③ PROCESS CODE ④ | |
| | · · | · · | · · · · · · · | · · · · · · · | |
| MILLING | MACHINE TOOL K | ESTIMATION | PROCESS CODE ⑪ PROCESS CODE ⑫ PROCESS CODE ⑬ | · · · · · · · | PROCESSING CODE |
| | | RESULT | PROCESS CODE ⑪ PROCESS CODE ⑫ · PROCESS CODE ⑬ | · · · · · · · | PROCESS CODE(PRODUCT NUMBER-MOLD NUMBER-METAL MOLD NUMBER-PROCESS NUMBER-PROCESSING NUMBER) |
| | · · | · · | · · · · · · · | · · · · · · · | |
| BORING | MACHINE TOOL Q | ESTIMATION | PROCESS CODE ⑲ · · · · · · · | · · · · · · · | |
| | | RESULT | PROCESS CODE ⑲ · · · · · · · | · · · · · · · | |
| | · · | · · | · · | · · | |

FIG. 25

| NAME OF MACHINE TOOL USED:A METAL DIE NAME:MOVABLE TYPE, PRODUCT NAME:SLIDE MOLDING |
|---|
| DRAWING INFORMATION<br><br>NUMBER OF KINDS OF GUN DRILL PROCESSING:2, NUMBER OF TIMES OF MACHINING IN GUN DRILL PROCESSING:13, OVERALL LENGTH OF GUN DRILL PROCESSING:5500mm<br><br>NUMBER OF KINDS OF GUN DRILL PROCESSING:2, NUMBER OF TIMES OF MACHINING IN GUN DRILL PROCESSING:6, OVERALL LENGTH OF GUN DRILL PROCESSING:2100mm<br><br>NUMBER OF KINDS OF GUN DRILL PROCESSING:2, NUMBER OF TIMES OF MACHINING IN GUN DRILL PROCESSING:33, OVERALL LENGTH OF GUN DRILL PROCESSING:10500mm<br><br>NUMBER OF KINDS OF GUN DRILL PROCESSING:1, NUMBER OF TIMES OF MACHINING IN GUN DRILL PROCESSING:22, OVERALL LENGTH OF GUN DRILL PROCESSING:5600mm<br><br>NUMBER OF KINDS OF GUN DRILL PROCESSING:2, NUMBER OF TIMES OF MACHINING IN GUN DRILL PROCESSING:13, OVERALL LENGTH OF GUN DRILL PROCESSING:6800mm |
| NAME OF MACHINE TOOL USED:B METAL DIE NAME:FIXED, PRODUCT NAME:LOCKER MOLDING |
| DRAWING INFORMATION<br><br>NUMBER OF KINDS OF GUN DRILL PROCESSING:2,<br>NUMBER OF TIMES OF MACHINING IN GUN DRILL PROCESSING:13,<br>OVERALL LENGTH OF GUN DRILL PROCESSING:6000mm<br>NUMBER OF KINDS OF SPOT FACING OPERATIONS:1,<br>NUMBER OF TIMES OF MACHINING IN SPOT FACING OPERATIONS:4<br>OVERALL LENGTH OF SPOT FACING:200mm<br>NUMBER OF KINDS OF TAPPING:1, NUMBER OF TIMES OF TAPPING:10<br>OVERALL LENGTH OF TAPPING:100mm<br><br>NUMBER OF KINDS OF GUN DRILL PROCESSING:1, NUMBER OF TIMES OF MACHINING IN GUN DRILL PROCESSING:7, OVERALL LENGTH OF GUN DRILL PROCESSING:1700mm<br>NUMBER OF KINDS OF TAPPING:1, NUMBER OF TIMES OF TAPPING:7<br>OVERALL LENGTH OF TAPPING:100mm<br><br>NUMBER OF KINDS OF GUN DRILL PROCESSING:1, NUMBER OF TIMES OF MACHINING IN GUN DRILL PROCESSING:4, OVERALL LENGTH OF GUN DRILL PROCESSING:400mm<br>NUMBER OF KINDS OF SPOT FACING OPERATIONS:1, NUMBER OF TIMES OF MACHINING IN SPOT FACING OPERATIONS:4, OVERALL LENGTH OF SPOT FACING:100mm<br>NUMBER OF KINDS OF TAPPING:1, NUMBER OF TIMES OF TAPPING:4,<br>OVERALL LENGTH OF TAPPING:30mm<br><br>NUMBER OF KINDS OF GUN DRILL PROCESSING:1, NUMBER OF TIMES OF MACHINING IN GUN DRILL PROCESSING:13, OVERALL LENGTH OF GUN DRILL PROCESSING:7700mm<br>NUMBER OF KINDS OF TILTED GUN DRILL PROCESSING:1, NUMBER OF TIMES OF MACHINING IN TILTED GUN DRILLING:3,<br>OVERALL LENGTH OF TILTED GUN DRILLING:2900mm<br>NUMBER OF KINDS OF SPOT FACING OPERATIONS:1, NUMBER OF TIMES OF MACHINING IN SPOT FACING OPERATIONS:4, OVERALL LENGTH OF SPOT FACING:400mm<br>NUMBER OF KINDS OF TAPPING:1, NUMBER OF TIMES OF TAPPING:13,<br>OVERALL LENGTH OF TAPPING:100mm<br><br>NUMBER OF KINDS OF GUN DRILL PROCESSING:1, NUMBER OF TIMES OF MACHINING IN GUN DRILL PROCESSING:4, OVERALL LENGTH OF GUN DRILL PROCESSING:1000mm<br>NUMBER OF KINDS OF SPOT FACING OPERATIONS:1, NUMBER OF TIMES OF MACHINING IN SPOT FACING OPERATIONS:2, OVERALL LENGTH OF SPOT FACING:200mm<br>NUMBER OF KINDS OF TAPPING:1, NUMBER OF TIMES OF TAPPING:4<br>OVERALL LENGTH OF TAPPING:10mm |

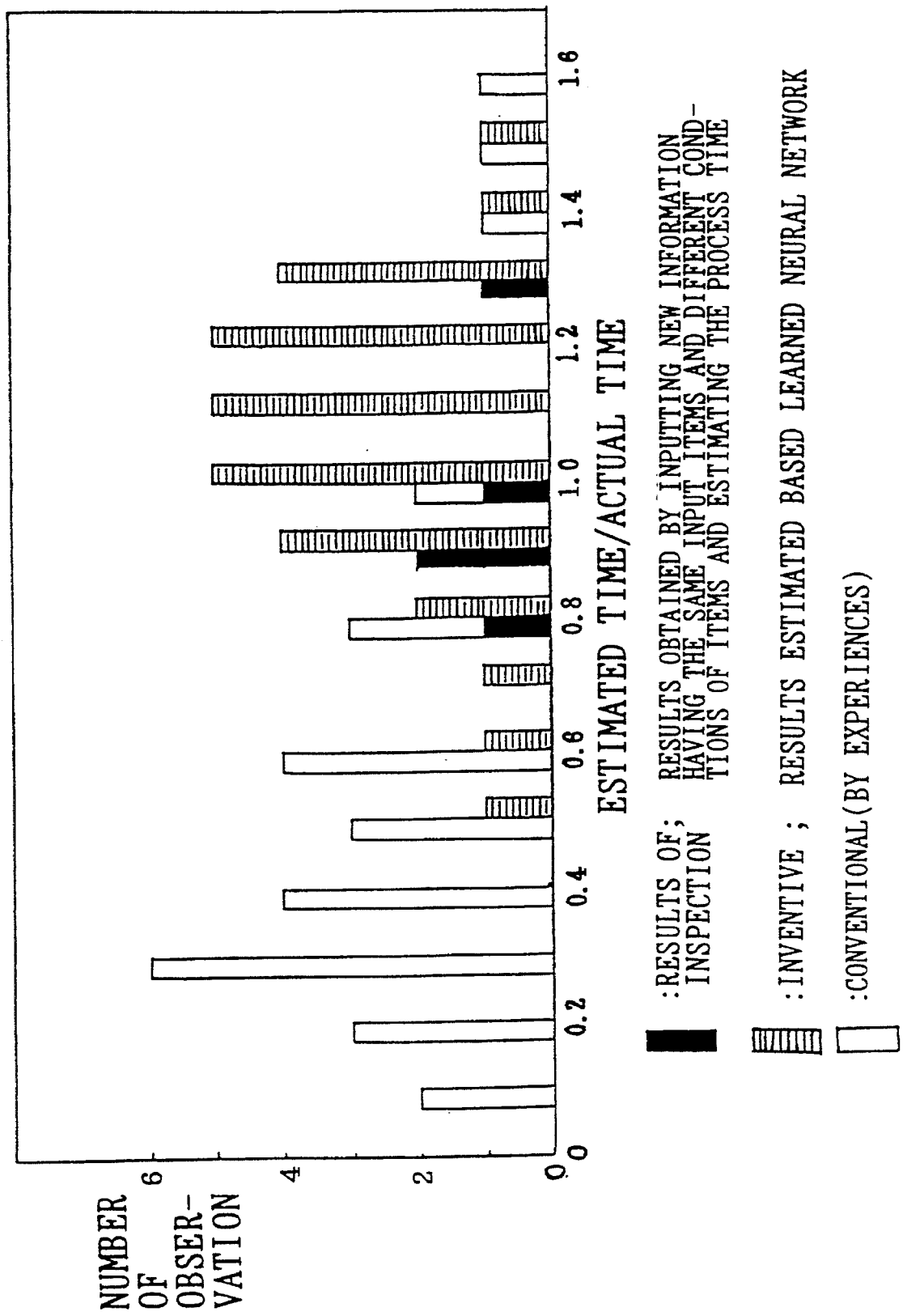

FIG. 28

| |
|---|
| NAME OF MACHINE TOOL USED:A METAL DIE NAME:FIXED, PRODUCT NAME:URETHAN BUMPER REAR |
| DRAWING INFORMATION<br><br>NUMBER OF KINDS OF GUN DRILL PROCESSING:3, NUMBER OF TIMES OF MACHINING IN GUN DRILL PROCESSING:46, OVERALL LENGTH OF GUN DRILL PROCESSING:15800mm<br><br>NUMBER OF KINDS OF GUN DRILL PROCESSING:3, NUMBER OF TIMES OF MACHINING IN GUN DRILL PROCESSING:36, OVERALL LENGTH OF GUN DRILL PROCESSING:12300mm |
| NAME OF MACHINE TOOL USED:B METAL DIE NAME:MOVABLE TYPE, PRODUCT NAME:URETHAN BUMPER REAR |
| DRAWING INFORMATION<br><br>NUMBER OF KINDS OF GUN DRILL PROCESSING:1, NUMBER OF TIMES OF MACHINING IN GUN DRILL PROCESSING:13, OVERALL LENGTH OF GUN DRILL PROCESSING:7400mm<br>NUMBER OF KINDS OF TILTED GUN DRILLING:1, NUMBER OF TIMES OF MACHINING IN TILTED GUN DRILLING:4, OVERALL LENGTH OF TILTED GUN DRILLING:3300mm<br>NUMBER OF KINDS OF SPOT FACING OEPRATIONS:1, NUMBER OF TIMES OF SPOT FACING OPERATIONS:5, OVERALL LENGTH OF SPOT FACING PROCESSING:500mm<br>NUMBER OF KINDS OF TAPPING:1, NUMBER OF TIMES OF TAPPING:13, OVERALL LENGTH OF TAPPING:100mm<br><br>NUMBER OF KINDS OF GUN DRILL PROCESSING:1, NUMBER OF TIMES OF MACHINING IN GUN DRILL PROCESSING:11, OVERALL LENGTH OF GUN DRILL PROCESSING:5500mm<br>NUMBER OF KINDS OF TILTED GUN DRILLING:1, NUMBER OF TIMES OF MACHINING IN TILTED GUN DRILLING:2, OVERALL LENGTH OF TILTED GUN DRILLING:1500mm<br>NUMBER OF KINDS OF SPOT FACING OPERATIONS:1, NUMBER OF TIMES OF SPOT FACING OPERATIONS:2, OVERALL LENGTH OF SPOT FACING PROCESSING:200mm<br>NUMBER OF KINDS OF TAPPING:1, NUMBER OF TIMES OF TAPPING:7, OVERALL LENGTH OF TAPPING:100mm<br><br>NUMBER OF KINDS OF GUN DRILL PROCESSING:1, NUMBER OF TIMES OF MACHINING IN GUN DRILL PROCESSING:14, OVERALL LENGTH OF GUN DRILL PROCESSING:7400mm<br>NUMBER OF KINDS OF TILTED GUN DRILLING:1, NUMBER OF TIMES OF MACHINING IN TILTED GUN DRILLING:2, OVERALL LENGTH OF TILTED GUN DRILLING:1400mm<br>NUMBER OF KINDS OF SPOT FACING OPERATIONS:1, NUMBER OF TIMES OF SPOT FACING OPERATIONS:2, OVERALL LENGTH OF SPOT FACING PROCESSING:200mm<br>NUMBER OF KINDS OF TAPPING:1, NUMBER OF TIMES OF TAPPING:14, OVERALL LENGTH OF TAPPING:100mm |

FIG. 29

| | | |
|---|---|---|
| NAME OF MACHINE : C<br>TOOL USED : URETHANE BUMPER REAR<br>PRODUCT NAME : MOVABLE<br>NAME OF DIE MOLD : MOVABLE<br>PROCESSING METHOD : NC MACHINING<br>PROCESSING STEP : ROUGH MACHINING | AREA OF FALT ARE : 408000mm$^2$<br>AREA OF UPPER VERTICAL WALL : 257856mm$^2$<br>AREA OF LOWER VERTICAL WALL : 169728mm$^2$<br>AREA OF SIDE VERTICAL WALL : 148000mm$^2$ | AREA OF PARTING SECTION<br>(SHEILD SECTION) : 133440mm$^2$<br>AREA OF COTTER SECTION : 978560mm$^2$ |

PROCESS TIME ESTIMATING APPARATUS

FIELD OF THE INVENTION

This invention relates to an apparatus for estimating the process time for manufacturing products.

BACKGROUND OF THE INVENTION

In manufacturing of varied products, such as manufacturing of metal dies, an indefinite time duration is consumed in shape modelling, NC processing, machining or a preparatory process, for machining metal die parts requiring intricate shaping from step to step. As a result it is almost impossible to calculate accurately the process time and hence to set up accurate scheduling through to the end of manufacturing. The present invention overcomes this drawback. More specifically, the present invention relates to an apparatus for estimating the time of the manufacturing processes whereby the process time may be estimated with high accuracy by means of a neural network having the self-learning and self-multiplicative functions. By taking account of the fact that the factors of machining and machining time are correlated with each other, it is possible with the neural network to make accurate estimation of the process time, by relying upon its learning function by weighting the coupling coefficients between different neurons with indefinite factors involved in shape modelling, NC processing, machining or preparatory process by taking account of workshop or operating environments. Thus the present process time estimation apparatus renders it possible to make highly accurate estimation of the process time in the production of varied products to set up an accurate production schedule through the completion of manufacturing.

Definition (1) The "product" is a term generally designating unitary articles, such as metal dies, engine components or cast products, and articles made up of plural components or elements, such as mating dies, driving systems, such as engine blocks, engines, transmissions, braking systems, car bodies or motor vehicles.

(2) The term "manufacturing" means at least processing and assembling of the articles and occasionally one or more of the following: shape modelling, inspecting, measuring or adjusting, regulating or re-assembling (3) The term "processing" means machining, such as cutting, grinding, punching or severing, plastic processing, such as press-working, material processing or manufacturing, such as welding (welding off) or casting, heat treatment, electric discharge machining, laser machining, electron beam machining, physical or chemical processing or treatment, such as surface treatment (etching), or coating.

(4) The term "process" means, besides each processing step or process, product flow process between respective processes (transport and temporary storage), and optionally shape modelling in metal dies, inspection, measurement, adjustment, control or re-assembling. In general, a process consists of a combination of a number of sub-processes or sub-steps.

(5) The term "drawing information" means detailed processing information for manufacturing a particular unitary article such as a die. It includes the kinds of particular subprocesses such as drilling or milling used in the manufacturing, the number of times such subprocesses are to be performed and the dimensions associated with the subprocesses such as hole depth. An example of such drawing information is given in FIGS. 28 and 29.

Related Art

In manufacturing plants of varied products, for example, in metal die manufacturing plants, the process time is estimated by taking out desired information from the drawings and quantified by relying upon operator's or supervisor's experiences. For example, in a drilling or perforating process, the overall length of cooling water conduits, conduits for lubricant etc. and the total number of the conduits are multiplied by respective coefficients, which are based on experiences, and the resultant two products are summed together to find the process time. Although it is desired to automate the calculation, there are currently known only a few apparatus for calculating the process time and estimation for certain particular types of processing, that is electric discharge machining and NC machining, which are based on methods specific to the types of machining, as shown for example in JP Patent KOKAI Publications Nos.2-100822 and 3-5802. As a process supervising apparatus in general, there is currently known only an apparatus in which the process is developed and priority ranking in operation instructions is made on the basis of the allowance factor of the time for delivery and allowance factor for work to find the status of progress based on collection of information concerning completed works (JP Patent KOKAI Publication No.2-310703).

Problems to be Solved by the Invention

However, it is not possible with the methods based on experiences to cope with temporal technical improvement in taking account of variegated conditions of manufacturing processes, that is development of machining technologies, improvement in accuracy of metal die products and shape variation, and changes in operating rates of machine tools in plants caused by boom-and-bust cycles in industries. For this reason, it occurs frequently that estimated process time differs considerably from the actual process time, while the process time estimated by experiences cannot cope with changes in the conditions of the manufacturing process such as metal die environments. As a consequence, there is a need for improvement of such time estimations.

On the other hand, with the above-mentioned conventional process-estimating apparatus, it is impossible to make a generalization of the apparatus in order to make use of it for estimation of a complex process made up of varied sub-processes.

In keeping up with evolutional changes in the industrial fields, multiple product types, multiple functions, delivery of products within a contract term and a determination of manufacturing time are required for products, such as metal dies. Above all, delivery of products within the contract term is a crucial item to be fulfilled by the manufacturer and poses a problem of confidence which the manufacturer owes to society. However, the currently available technique for fulfilling the demand for delivery in time, that is the technique of estimating the time necessary for the process steps necessary for manufacturing a product such as a metal die, is based on experiences of a plant supervisor or operator. Such at technique has become increasingly unsatisfactory in meeting the changing demands made by industry. A typical example is shown in FIG. 7 from which it is clearly shown that the actual machining time involved in preparation of holes for insert of the same drawing sheet differs considerably from the estimated machining time by four skilled estimators. The result is that overtime is increased to complete the work on time as the date for delivery approaches, thereby raising labor costs or manufacturing costs of metal dies or producing difficulties in labor control or management.

In light of the foregoing, it is becoming impossible with conventional empirical techniques to make time estimations which are satisfactory from the point of view of delivery scheduling cost calculation or labor control or management. Thus there is an increasing demand for a process time estimating apparatus for estimating the process time based on the correlation between the process time and processing factors provided by manufacturing means, such as machinery or apparatus in use or drawing information at the time when the drawing is furnished.

SUMMARY OF THE INVENTION

It is a basic object of the present invention to provide a process time estimating apparatus which is adapted for accurately estimating the process time based on the drawing information for a prescribed product and the corresponding manufacturing steps. The invention may be applied to various machining steps for manufacturing a product to render it possible to estimate the total process time by taking the sum of the process time for each machining step.

On the other hand, the process time estimating apparatus is required to have the self-learning and self-multiplicative functions during calculation of the process time for process steps, in other words, the apparatus is required to meet changes which manufacturers must fulfil to meet changes in social needs. If the process time estimating apparatus satisfying these requirements is completed, the process time for each process step may be accurately estimated to meet the social needs at the time of manufacturing metal dies etc. so that the date of product completion may be presented accurately. Therefore, it is also an object of the present invention to provide a highly flexible process time estimating apparatus whereby these problems may be solved simultaneously.

Means to Solve the Problem

First Aspect

The foregoing problems may be solved by a process time estimating apparatus having a process time estimating section, a process occupancy time measurement section and a process program scheduling section.

The process time estimating section includes a neural network device.

An estimation input factor extracting section extracts an estimating input factors.

A storing section stores input factors for neural network learning.

A selecting section selects process time for neural network learning.

And the process occupancy time measurement section reads the process code for each process and automatically makes an actual time measurement from the process corresponding to the process code.

Finally, the process program scheduling section may receive output information from the process occupancy time measurement section and store an estimated process time from the neural network.

There is a demand for a process time estimating apparatus having self-learning and self-multiplicative functions capable of coping with changes in a degree of requirements laid on a producing company producing a metal die etc. which arise with the variation of social needs. For achieving these functions, it is necessary for the process time estimating apparatus to be constructed on the basis of a neural network device. That is, the functions of self-learning and self-multiplication required in estimating the process time may be achieved by the neural network device having the function and operation closer to those of the human brain than the conventional electronic computer and having the functions of learning, self-organization and creation, that is the functions of self-multiplication and super-parallel function. In this manner, estimation of each process time may be outputted with high accuracy at the time of supply of production drawings for observing the time of delivery required in manufacturing of articles, such as metal dies.

For achieving the self-learning and self-multiplicative functions, the network structure in the neural network device is of a back-propagation type or an interconnection type. If the network device is of the back-propagation type, it is composed of an input layer, an intermediate layer and an output element. If the network device is of the interconnection type, it may function satisfactorily with an input layer, a hidden element and an output element, as invented by one of the present inventors (JP Patent KOKAI Publication No.2-309447). This neural network device may be constructed by, for example, Sigmoid function means, corresponding to neuron elements and, as an actual product, it may be designed by a neural network device employing corresponding neuron chips.

According to the present invention, the information concerning the manufacturing process (drawing information, such as a name of drilling process step, the number of holes machined, or the overall length of the holes), the information concerning manufacturing means scheduled to be used (names used in plants, such as names of machine tools) or the name of an object (e.g. metal die) are sequentially inputted to the input layer.

After the end of each machining or processing process, the time involved in each process, actually required by manufacturing means, is inputted as a teacher signal to an output element to produce a learned neural network. If the coupled state between the neuron elements is of an interconnected type, the propagation direction of the input factors and the teacher signal becomes bidirectional, by employing a bidirectional network structure for a signal flow, indicating an associative mechanism at the time of reminding of the process time and in the course of learning. Besides, the coupling coefficient between the neuron elements may be computed to clarify if it is positive or negative in sign. That is, after inputting each factor, the coupling coefficient is corrected by an amount corresponding to the difference in the network energy to repeat the learning until a system with a minimum energy is obtained to produce a learning-completed structure. The effect which the input factors have on process time estimation becomes clear in the course of correcting the coupling coefficient so that a highly accurate process time estimating apparatus subject to only small variance in the estimated time may be produced by employing the learned network device. Besides, since the coupled state between the neuron elements is bidirectional, the propagation direction of the input factors and the teacher signal becomes bidirectional, the process time estimation employing the learned network becoming an associative mechanism.

The process time estimating apparatus based on the back-propagation type or interconnection type neural network NN is convenient in estimating the process time for multiproduct manufacturing in which the manufacturing process consists of a number of process steps, as in producing metal dies, with the network having the ability of comprehending indefinite factors, such as variances in process time caused by preparatory steps, workshop conferences or maintenance of machine tools. This fact is favorable for achievement of delivery date, cost computation and labor control, inasmuch as the process time estimating apparatus comprehends effects on the variation of social needs and production capacity and presents highly accurate process time estimation.

Second Aspect

Preferably, the manufacturing process information includes at least the drawing information and the information concerning manufacturing means, and the process occupancy time measurement section preferably reads the process code for each of the process steps involved in the manufacturing means. This provides premises for flexibility with respect to varied products (articles) and different manufacturing means (processing means) or manufacturing processes (machining or processing processes).

Third Aspect

The process occupancy time measurement section comprises a process operating time measurement section for reading the operating time of manufacturing means for each process, a process scheduling section for displaying or modifying process scheduling responsive to an output of said process operating time measurement section, and a process operating time suming section for producing a process occupancy time in response to an output of the process scheduling section, wherein the Process operating summing section supplies its output to the neural network device as learning information. In this manner, it becomes possible to improve estimation accuracy by summing the actual operating time of each manufacturing means (processing means for each process step) and uninterrupted learning (continual learning) based on the results of summation.

Fourth Aspect

In aspect 3, it is preferred that, in the above-mentioned process occupancy time measurement section, the process operating time summing section receives the process code name and the name of manufacturing means from the storing section of input factor for neural network learning and receives the processing code from the process scheduling section until the process code name in the processing code transmitted from the process scheduling section becomes equal and, at a time point when it receives the processing code name bearing the same process code name, receives and sums the actual processing time, while the process scheduling section receives the processing time estimated by the neural network device in the process time estimating section from the neural network device to put it in an estimation column of the manufacturing means along with the processing code name, receives the processing code name, name of manufacturing means and the actual processing time from the process operating time measurement section to put the processing code name and actual operating time in the result column of the same name of the manufacturing means, receives the processing code name from the selecting section for selecting process time for neural network learning (the teacher signal) and transmits the estimated time for the processing code name to the selecting section for selecting process time for neural network learning (the teacher signal) as the process time information.

In this manner, learning accuracy in aspect 3 may be improved.

Fifth Aspect

Preferably, the process planning section includes a work planning section, which classifies the drawing information according to the processing sites to determine the processing sequence and transmits the processing code name, consisting in the process code name of which the processing number is added to the trailing end, to the estimation input factor extracting section in the process time estimating section along with the classified drawing information.

In this manner, an estimating operation of the process including complex processing sites (and hence complex processing steps) is enabled in an orderly manner to easily cope with extremely complex cases, such as metal die manufacturing.

Sixth Aspect

Preferably, the above-mentioned input factor extracting section includes a drawing information storage section for process time estimation, the drawing information storage section classifying the processing process into partial processing processes based on the drawing information and storing the number of kinds of the partial processing processes, the total number of times of the processing processes and the required overall length of processing. In this manner, estimating steps for each partial processing process for an article of complex shape, such as a metal die, may be obtained easily from the drawing information.

Seventh Aspect

The above-mentioned neural network device preferably includes a back-propagation or interconnection type network structure. This assure a high degree of flexibility for adaptation to changes in conditions of the respective processes, facilitated learning and improved estimation accuracy.

Eighth Aspect

Preferably, the above-mentioned process occupancy time measurement section is replaced by a process operating time measurement section, a process scheduling section functioning as estimating means and connected to an output of said neural network device, and a process operating time summing section responsive to an output of the process scheduling section to output a process operating time, the process scheduling section puts the processing time estimated by the neural network device in an estimation column of the manufacturing means along with the processing code name, receives the processing code name, name of manufacturing means and the actual processing time from the process operating time measurement section and puts them in the result column of the manufacturing means along with the processing code name while transmitting them to the selecting section for selecting process time for neural network learning, and the process operating time summing section outputs the summed operating time to the process program scheduling section (this applies to aspects 5, 6 and 7 as well).

The advantages of the present aspect reside in that scheduling with each NC tape as a unit for each machine tool is rendered possible by the provision of the process scheduling section, and that the operating or loaded state of each machine tool (manufacturing means) may be accurately grasped by comparison with the displayed contents of the process program scheduling section.

In the process time estimating apparatus according to the present invention, the time involved in the process of the machine tool (manufacturing means) scheduled to be used may be estimated with high accuracy from process to process at the time the planning drawing is rendered available (at the time of furnishing of metal die design drawing) and the date of completion of the product may be estimated by summing the process time in the respective processes. In this manner, it becomes possible for the managers or operators of the manufacturing plant to draw up a schedule for product delivery in due time at the time the drawing is rendered available to them, while wasteful expenses may be saved and labor control may also be facilitated because the overtime schedule may be formulated in advance.

As for the construction of the learned network of the neural network device, the network may be constructed to cope with the variance of load of the manufacturing plant caused by social changes. Besides, the learned network may be controlled in accuracy, that is, estimation accuracy may be controlled by the provision of the selecting section for selecting the process time for neural network learning (the teacher signal), so that process program scheduling capable of coping with the objective may be presented.

The advantages derived from the third aspect of the invention is that the actual operating time for each manufacturing means (processing means for each process step) may be summed from process to process to improve estimation accuracy based on successive learning based on the results.

BRIEF DESCRIPTION OF THE DRAWINGS

FIG. 7 shows a table for showing a difference between estimated time and actual time by using an empirical formula.

FIG. 11 shows a flow chart of a process planning section of a process time estimating apparatus for metal die manufacturing.

FIG. 12 shows a manufacturing schedule table I for a process time estimating apparatus for metal die manufacturing.

FIG. 14 shows details of storing section of a drawing information items of a process time estimating apparatus for metal die manufacturing.

FIG. 16 shows a process program scheduling table I of a process time estimating apparatus for metal die manufacturing.

FIG. 17 shows a manufacturing schedule table II of a process time estimating apparatus for metal die manufacturing.

FIG. 18 shows a process program scheduling table II of a process time estimating apparatus for metal die manufacturing.

FIG. 19 shows a flow chart for a storing section of input factor for neural network learning of a process time estimating apparatus for metal die manufacturing.

FIG. 20 shows a flow chart for a measurement section of time taken by machine tool of a process time estimating apparatus for metal die manufacturing.

FIG. 21 shows a flow chart for a selecting section for selecting process time for neural network learning (the teacher signal) of a process time estimating apparatus for metal die manufacturing.

FIG. 22 shows a flow chart for an addition section for adding time taken by the machine tool of a process time estimating apparatus for metal die manufacturing.

FIG. 23 shows a flow chart for a manufacturing scheduling section of a process time estimating apparatus for metal die manufacturing.

FIG. 24 shows a manufacturing scheduling table of a process time estimating apparatus for metal die manufacturing.

FIG. 25 shows an example of the input drawing information of the process time estimating apparatus during the metal die drilling process.

FIG. 27 shows an example of verification of the process time estimating apparatus in estimating the metal die drilling process time.

FIG. 28 shows an example of inputting drawing information for verification of a process time estimating apparatus in estimating the metal die drilling process time.

FIG. 29 shows an example of inputting drawing information of a process time estimating apparatus in estimating the metal die milling process time.

DESCRIPTION OF THE PREFERRED EMBODIMENTS

Figure 1:
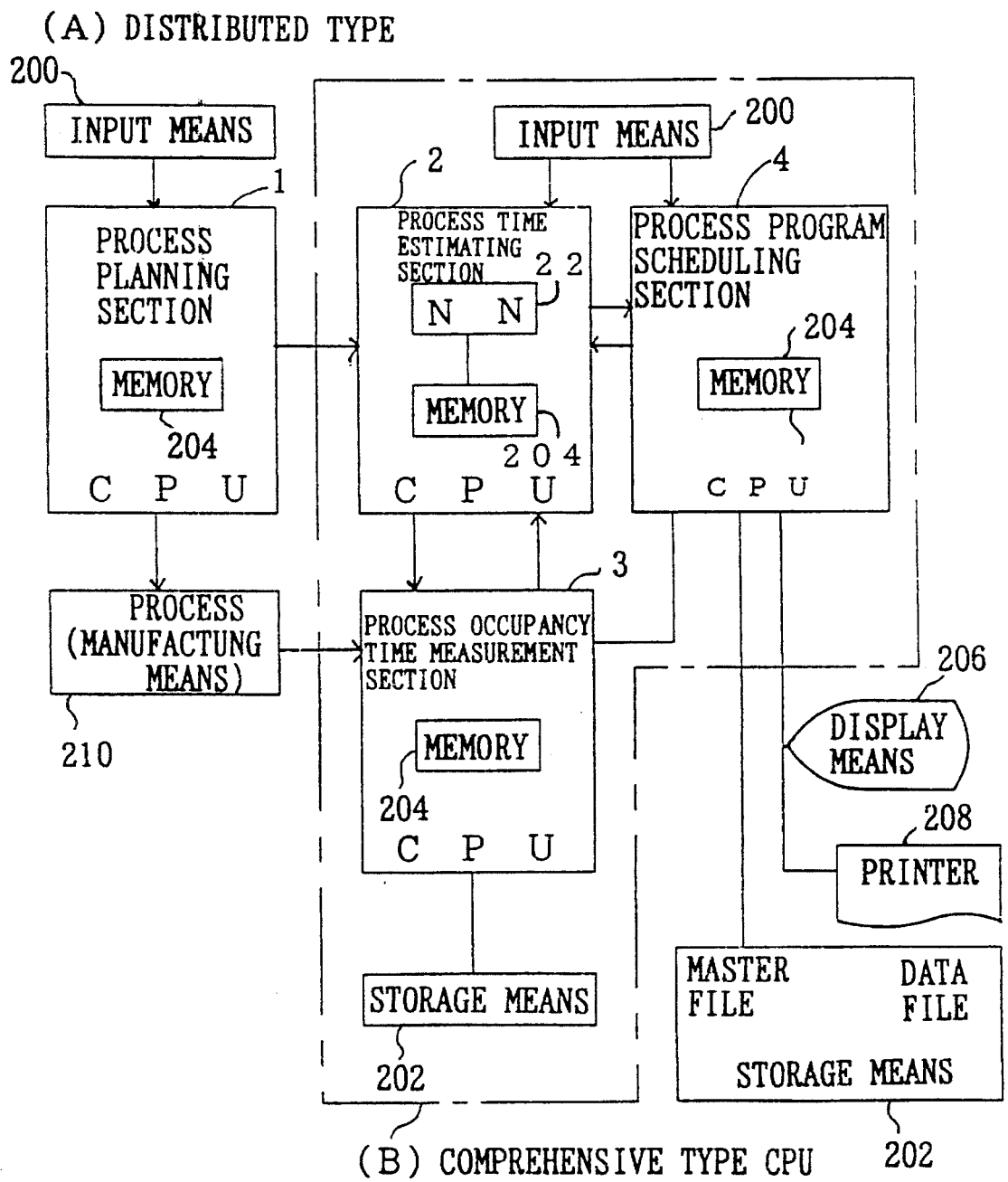
FIG. 1 shows a conceptual schematic block diagram showing an overall construction (hardware aspect) according to an embodiment of the present invention.

FIG. 1 shows, in a conceptual block diagram, an embodiment of a process time estimating apparatus according to the present invention. The portions indicated by solid lines denote a distributed type (A), while the portions indicated by chain-dotted line frames may be a comprehensive central controlling apparatus (B). Although not shown in part, each portion or section preferably includes separate means such as input means 200, storage 202, internal memory 204 (e.g. RAM), display 206 and printer 208 etc.

A preferred embodiment of the present invention is hereinafter explained by taking an example of metal die manufacturing.

(Meanwhile, in producing other products, corresponding adaptation is made depending on the difference in the processes and manufacturing means 210.)

(1) An apparatus for estimating the process time for producing a metal die is an apparatus for estimating manufacturing process time for multiproduct manufacturing comprising a process planning section 1 (occasionally including a work planning section), a process time estimating section 2, a process (machine tool) occupancy time measurement section 3, and a process program scheduling section 4.

The process time estimating section 2 is made up of an estimation input factor extracting section, a neural network device 22 having process time estimating and learning means, a storing section of input factor for neural network learning 23 and a selecting section for selecting process time 24 for neural network learning (the teacher signal).

The process planning section 1 receives the drawing information (CAD data etc.) from the planning section, classifies the information into shape data and attributes data according to various processes (drilling, milling and boring processes), sets the processing sequence for each process, nominates the process code names consisting of a product name, a metal die name and a process number, classifies the data into the shape data and the attributes data for each process code name and transmits the process code name, its shape data and attributes data to the estimation input factor extracting section in the process time estimating section;

The estimation input factor extracting section 21 extracts the drawing information items for process time estimation from the shape data and the attributes data classified according the the process code name, compares them with the drawing information items for process time estimation which the estimation input factor extracting section receives from the storing section of the drawing information, items for process time estimation, extracts the drawing information for process time estimation, and transmits the drawing information for process time estimation with machine tool name and process code name which the estimation input factor extracting section receives from process program scheduling section to time estimation means in the neural network device and the storing section of input factor for neural network learning, while transmitting the shape data, attribute data and the process code name to the process planning section.

The process program scheduling section 4 receives the process time estimated by a neural network device from the time measurement section for the machine tool, receives the process code name and the actual involved time to put the process code name (if necessary, machine tool name) and the involved time in the result column of the same machine tool name, receives the process code name from the selecting section for selecting process time for neural network learning (the teacher signal) and transmits the estimated time for the process code name to the selecting section 24 for selecting process time for neural network learning (the teacher signal);

The storing section 23 of input factor for neural network learning receives and stores the process code name, the drawing information and the machine tool name from the estimation input factor extracting section to transmit the process code name and machine tool name to process occupancy time measurement section, receives enable/disable signal for neural network learning for each process code name from the selecting section for selecting process time for neural network learning (the teacher signal), transmits the process code name, the drawing information and further the machine tool name to the learning means of the neural network device in case of the learning enable signal and deletes the process code name, the drawing information and the machine tool name in case of the learning disable signal.

The process occupancy time measurement section 3 receives the process code name and the machine tool name from the storing section of input factor for neural network learning, measures the time involved in the process (machine tool) of a metal die bearing the process code name, transmits the process code name (machine tool name) and process occupancy time to the process program scheduling section and to the selecting section for selecting process time for neural network learning (the teacher signal), receives the process code name, the process occupancy time and an enable/disable signal for selecting process time for neural network learning (the teacher signal) from the selecting section, transmits the process occupancy time to the neural network in case of learning enable signal and deletes the process code name (and also the machine tool name) and the process occupancy time in case of learning disable signal.

The selecting section 24 for selecting process time for neural network learning (the teacher signal) receives the process code name (machine tool name) and process (machine tool) occupancy time from the process occupancy time measurement section, transmits the process code name (processing machine name) to the process program scheduling section, receives the estimated time for the process code name from the process program scheduling section, transmits a learning enable/disable signal to a storing section of input factor for neural network learning (the teacher signal) based on comparison of the estimated time to the occupancy time, and transmits the signal with addition of the process (machine tool) occupancy time to the process occupancy time measurement section.

(2) A process time estimating apparatus for metal die manufacturing according to (1) in which the process occupancy time measurement section according to (1) comprises a process operating time measurement section, a process scheduling section which receives an output of the process operating time measurement section, and a process operating time summing section receiving an output of the process scheduling section, and derives a process occupancy time to be inputted to a neural network having the process time learning means from the process (machine tool) operating time summing section.

The process (machine tool) operating time summing section receives the process code name (and further the machine tool name etc.) from the storing section of input factor for neural network learning, receives the processing code name from the process scheduling section until the process code name in the processing code transmitted from the process scheduling section becomes equal, receives the actual processing time from the process scheduling section at a time point when the processing code name bearing the same process code name is received, and sums the received actual processing time.

The process scheduling section 4 receives the processing time estimated by the neural network device 22 within the processing time estimating section from the neural network along with the processing code name to put the data in the estimation column of the machine tool, receives the processing code name, machine tool name and the actual processing time from the machine tool operating time measurement section to put the processing code name and the operating time in the result column of the same machine tool name, receives the processing code name from the selecting section for selecting process time for neural network learning (the teacher signal) and transmits the estimated time of the processing code name to the selecting section for selecting process time for neural network learning (the teacher signal).

Figure 5:
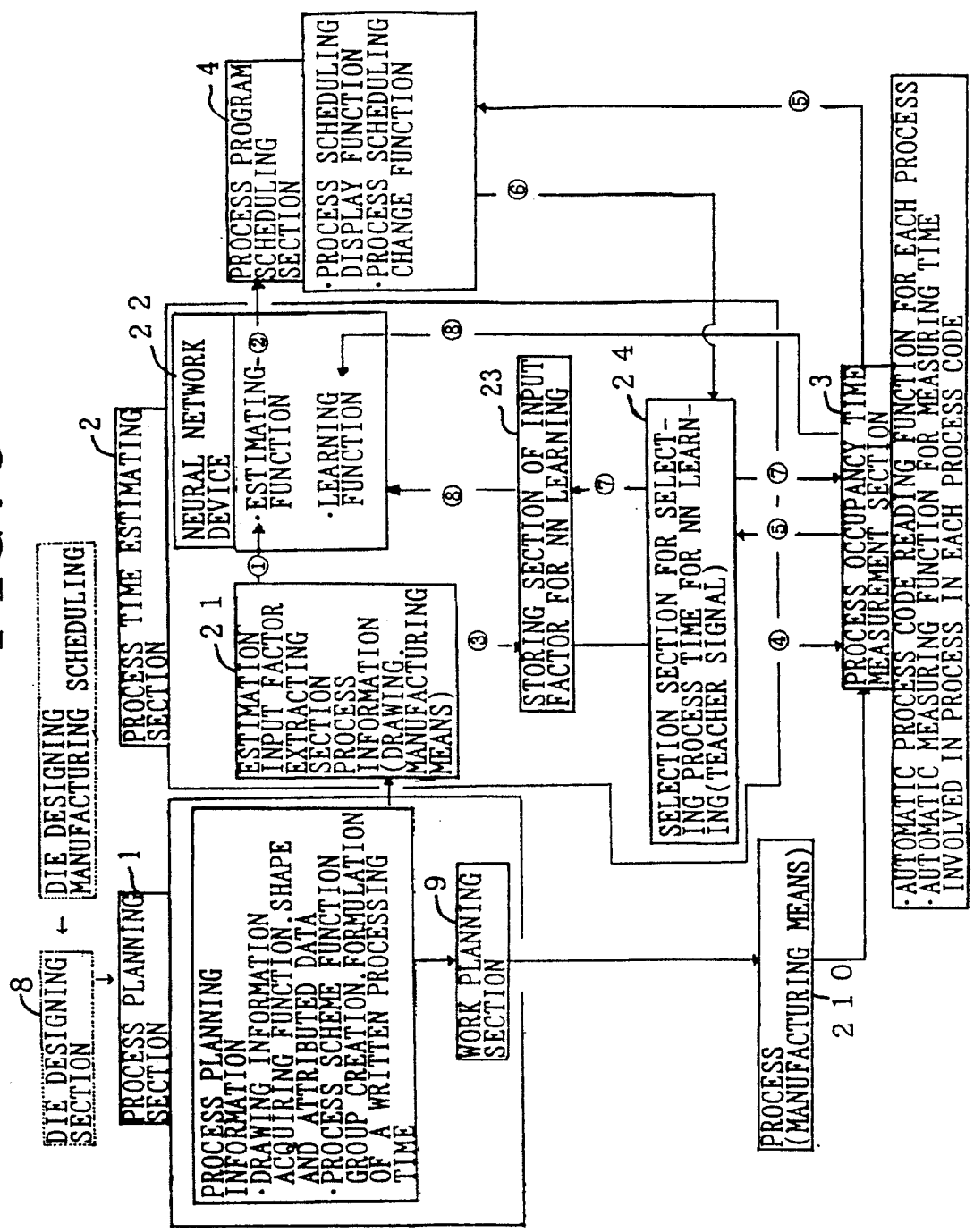
FIG. 5 shows a constructional view I of a process time estimating apparatus for metal die manufacturing.

As shown for example in FIG. 5, the processing time estimating section 2 is made up of an estimation input factor extracting section 21, a neural network device 22, a storing section 23 of input factor for neural network learning and a selecting section 24 for selecting process time for neural network learning (the teacher signal), these means having the same function as that of the means enclosed in the process time estimating section according to (1) above.

The work planning section 9 includes means for receiving the process code name, shape data and attributes data from the process planning section, and classifying into the shape data and the attributes data according to processing sites to decide the processing sequence and transmitting the processing code name consisting in the process code name to the trailing end of which the processing number is added to the estimation input factor extracting section in the process time estimating section along with the classified shape data and attributes data.

In the process time estimation for metal die manufacturing, the process is classified and developed, as an example, in the following manner: That is, the items stored in the process time estimation drawing information item storage section enclosed in the estimation input factor extracting section are classified into the drilling process, milling process and the boring process.

Each of these processes is developed in the following manner.

(a) The items in the drilling process for metal dies include the number of kinds, the number of times and the overall length of gun drilling, the ,number of kinds, the number of times and the overall length of inclined gun drilling, the number of kinds, the number of times and the overall length of spot facing, the number of kinds, the number of times and the overall length of inclined tapping, the number of times of reaming for reference pin of processing operations, the number of kinds, the number of times and the overall length of reaming for extrusion cores, the number of kinds, the number of times and the overall length of inclined reaming, the number of times of reaming of a pin for core extraction, the number of times of pin reaming for core extraction, the number of kinds, the number of times and the overall length of drilling, the number of kinds, the number of times and the overall length of inclined drilling, the name of functions of holes, the total number of hole cutting and overall length of the holes.

(b) The items in the metal die milling process include the area of the parting region obtained by summing (transverse length of a flat section+transverse length of a transverse upstanding wall section)×(width of the parting region)×2, or (longitudinal length of flat section+longitudinal length of upper upstanding wall+ longitudinal length of lower upstanding wall)×(width of parting region)×2 or (transverse length of flat section +transverse length of traverse upstanding wall+ longitudinal length of flat section+longitudinal length of upper upstanding wall+longitudinal length of lower upstanding wall)×(width of parting region)×2 and (overall periphery of a gap section in a product part)×(width of the parting region), and the area of the cotter region obtained by (transverse length of a flat section+ transverse length of a transverse upstanding wall section) ×(constant)×2 or (transverse length of flat section+ transverse length of transverse upstanding wall+ longitudinal length of flat section+longitudinal length of upper upstanding wall+ longitudinal length of lower upstanding wall)×(constant)×2.

Besides, in the rough to medium finishing milling machining stage, the item is developed into an area of a flat section, area of an upper upstanding wall, area of a lower upstanding wall and an area of a transverse upstanding wall.

In the finishing and superfinishing milling process, the item is developed into the longitudinal length of flat section/ transverse length of flat-section, the area of flat section, number of flutes in flat section, the overall length of flutes in flat section, the upstanding wall height in flat section/ longitudinal (transverse) length of flat section, the longitudinal length of upper vertical wall/transverse length of upper vertical wall, the area of upper vertical wall, the number of flutes in upper vertical wall, the overall length of flutes in upper vertical wall, the longitudinal length of upper vertical wall/longitudinal length of flat section, the height of upstanding wall of upper vertical wall/longitudinal (transverse) length of upper vertical wall, the longitudinal length of lower vertical wall/transverse length of lower vertical wall, the area of lower vertical wall, the number of flutes in lower vertical wall, the overall length of flutes in lower vertical wall, the longitudinal length of lower vertical wall/ transverse length of lower vertical wall, the height of upstanding wall of lower vertical wall/longitudinal (transverse) length of lower vertical wall, the longitudinal length of transverse upstanding wall/transverse length of transverse upstanding wall, the area of transverse upstanding wall, the number of flutes in transverse upstanding wall, the overall length of flutes in transverse upstanding wall, the transverse length of transverse upstanding wall/transverse length of flat section and height of upstanding wall of transverse upstanding wall/longitudinal (transverse) length of transverse upstanding wall.

(c) The items in the boring process for metal die is developed into the number of kinds, the total number of times of machining and the total machined area of reference surfaces for processing, the number of kinds, the total number of times of machining and the total machined area of slide surfaces, the number of times of machining and the total machined area of pressure-receiving surfaces, the number of times of machining and the total machined area of surfaces in general, the number of kinds, the total number of times of machining and the total machined area of square pocket holes for insert(cores), the total number of times of machining and the total machined area of round holes for insert (core) pins, the total number of times of machining and the total machined area of elongated holes for insert (core) pins, the number of kinds, the total number of times of machining and the total machined area of grooves, the total number of times of machining and the total machined area of holes or round cores, the total number of times of machining and the total machined area of holes for slide cores, the total number of times of machining and the total machined area of holes for extrusion (extraction) cores, the total number of times of machining and the total machined area of holes for extrusion (extraction) inclined cores.

An example of a learning stage of the neural network in the case of metal die manufacturing is hereinafter explained.

The entire processing process of metal die manufacturing from the delivery of a starting material up to the shipping of a completed product is roughly divided into a drilling process, a milling process and a boring process and input factors such as the drawing information, machine tool names, metal die names etc. are inputted into the back-propagation or interconnection type neural network device. The sum of the process time intervals actually required by the manufacturing means (machine tools etc.), that is the time involved since the metal die is set on the machine tool and dismounted from it, i.e., (effective processing time)+ (preparatory time)+(metal die set up time)+(machine tool operating time)+(working allowance time, such as time of operation of other a machine tool(s))+(workshop allowance time, such as workshop conferences or meetings) is inputted to the output element for learning. From the prescribed value of the coupling coefficients derived from learning and the process of setting an initial value, a learned network, in which the status values of the input and output elements are fixed at predetermined values in the neural network device, such as the drawing information, and the predetermined output value for the input value, herein the actual process occupancy time, is obtained.

Figure 2:
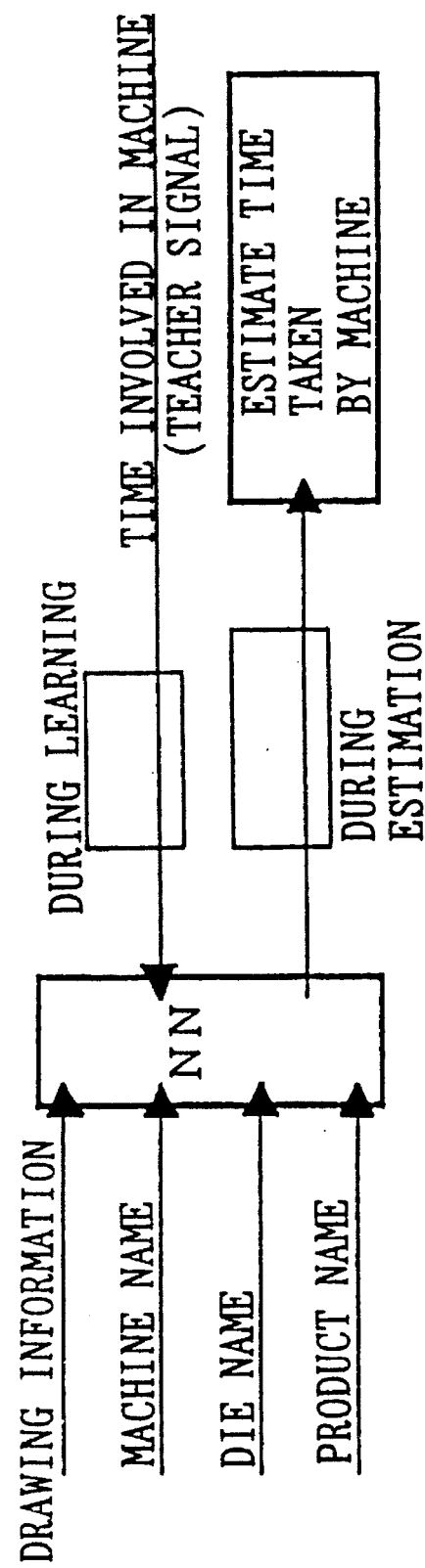
FIG. 2 shows a block diagram showing the principle of the method for estimating the process occupancy time involved in metal die manufacturing by a neural network NN.
Figure 3:
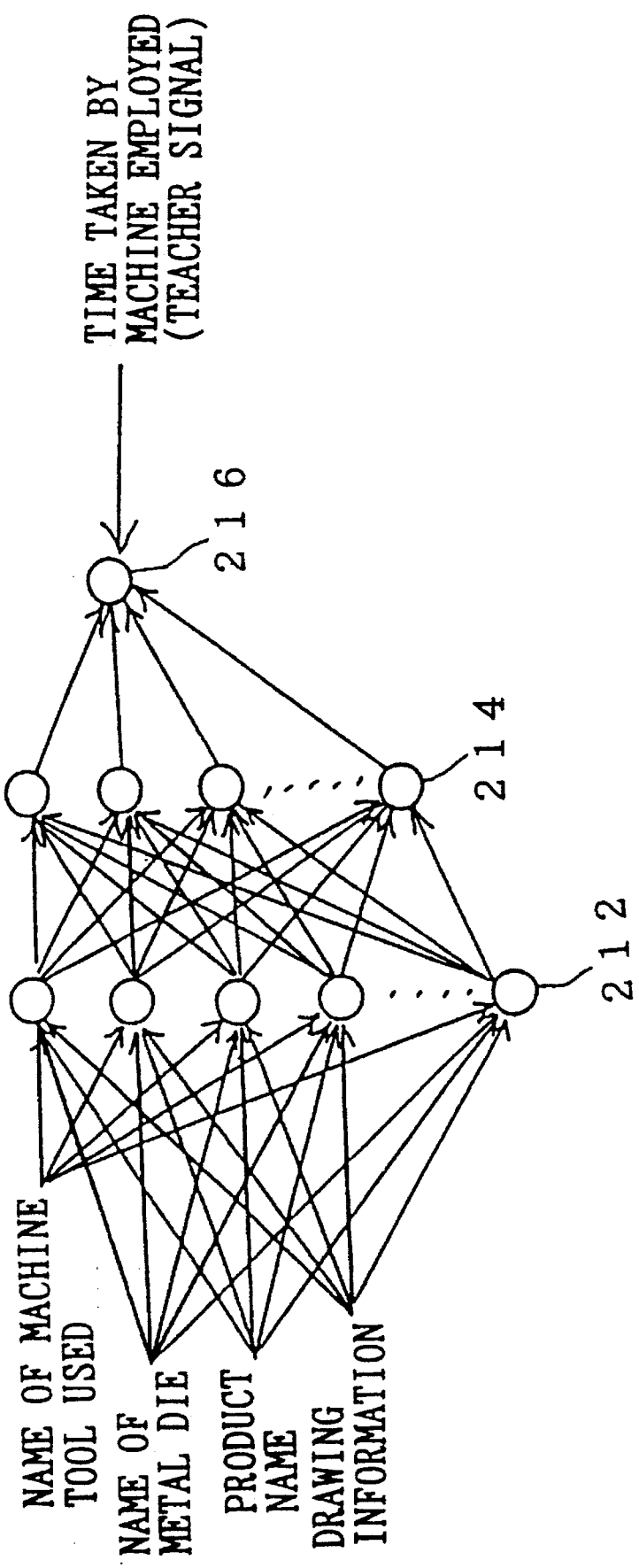
FIG. 3 shows a schematic view showing an example of a neural network (of a back-propagation method).

The basic principle of a neural network apparatus as one of means of the present invention is explained by referring to the drawings. The back-propagation type or interconnection type neural network apparatus is schematically shown in FIG. 2. As shown in FIG. 3 the neutral network may be made up of neuron elements of an input layer 212, an intermediate layer 214 or hidden element 216, and an output element. The drawing information, name of machine tool, name of metal die and product name are entered into neuron elements of the input layer. Actual the process times are entered into the output element and, in the case of the back-propagation type apparatus shown in FIG. 3, learning is carried out 10000 to 20000 times.

Figure 4:
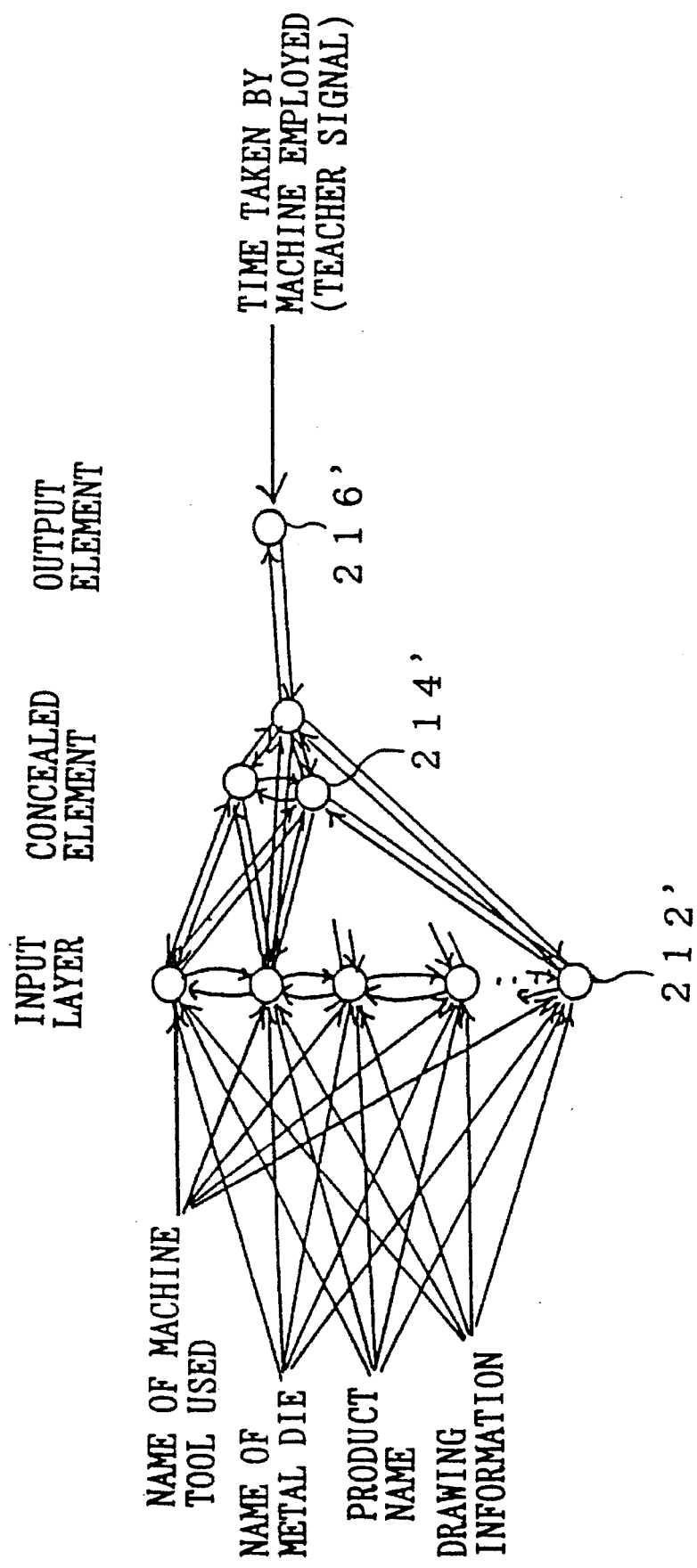
FIG. 4 shows a schematic view showing an example of a neural network (of an interconnection method).

In the case of the interconnection type neural network apparatus shown in FIG. 4, layers 212' and 214' and output element 216' are provided. The operation of correcting the coupling coefficient is carried out for all of the coupling coefficients in an amount corresponding to the difference between the product of state quantities of two elements acquired during the learning process and the product of state quantities of the two elements acquired during the anti-learning process wherein the two elements comprise one linkage or coupling. The correcting operation is carried out for each of the totality of the coupling coefficients. In this case, the coupling coefficients between the two elements affected by the input factors become positive or negative after learning and after anti-learning, respectively, in a definite manner, and a learned network, in which the process time may be estimated with high precision by the neural network, may be obtained by removing the input factors whereby the coupling coefficients become negative. Details of the learning and anti-learning processes by the interconnection type neural network may be performed in a manner disclosed in JP Patent KOKAI Publication H-2-309447. The back-propagation type apparatus is described in detail in connection with learning in "Neural Computing An Introduction" by R. Beale an T. Jackson (Adam Higler, issued in 1969).

The time taken by the machine tools employed may be estimated by inputting drawing information of new metal dies, name of machine tools to be in use, name of metal dies and name of products produced from the dies, using the thus obtained learned network.

If the preparatory process prior to actuation of the present apparatus by a manufacturing company is explained by taking an example of a metal die drilling process, the drawing information of each of six surfaces of the metal die, such as the number of kinds, the total number of times and the overall length of machining operations by a gun drill or the time taken by the machine tool in drilling the surface, are recorded, and a contrast table in which the drawing information, name of machine tools and the time taken by the machine tool are entered for comparison is prepared. Actual results are similarly recorded in the contrast table for the drilling operations performed for each of the metal die surfaces.

These means are effected for drilling other metal dies and a table showing the number of times of the operations, e.g. 60 to 100, is drawn up and actual examples which are recognized by skilled estimators to be the time taken by the machine tool from comparison between the drawing information and the machining capability of the machine tool are extracted from the contrast table. The drawing information and the name of machine tools of all of the selected examples are entered by manual operation from input means (keyboard) of CPU enclosing the neural network into the input layer of the neural network 22 in the process time estimating section 2 shown in FIG. 5. The time taken by the machine tool is entered into an output element of neural network 22 as a teacher signal. From the input values of the actual selected examples, input values are selected at random using a random number function and entered into the input layer of the neural network to find an output value (an estimate value) and the coupling coefficient between the neuron elements making up the neural network apparatus 22 is corrected until an error between the teacher signal of the time taken by machine tool and the output value is reduced to a minimum. This sequence of operations is repeated about 100000 to 500000 number of times to formulate the learned neural network.

Similar means are applied to the milling process and to the boring process to formulate learned neural network.

Certain embodiments of estimating the manufacturing process time in a metal die manufacturing company using the learned network apparatus 22 are hereinafter explained for respective types.

Embodiment 1

The conceptual view showing the process time estimating apparatus inclusive of the neural network comprising process time estimating and learning means (embodiment 1) is shown in FIG. 5. The apparatus includes a process planning section 1, a process time estimating section 2, a process occupancy time measurement section 3 and a process program scheduling section 4. The process time estimating section 2 is made up of an estimation input factor extracting section 21, a neural network 22, a storing section of input factors for neural network learning 23 and a selection section for selecting process time for neural network learning (the teacher signal). The numerals (① to ⑧) in FIG. 5 indicate the sequence of data communication.

Figure 6:
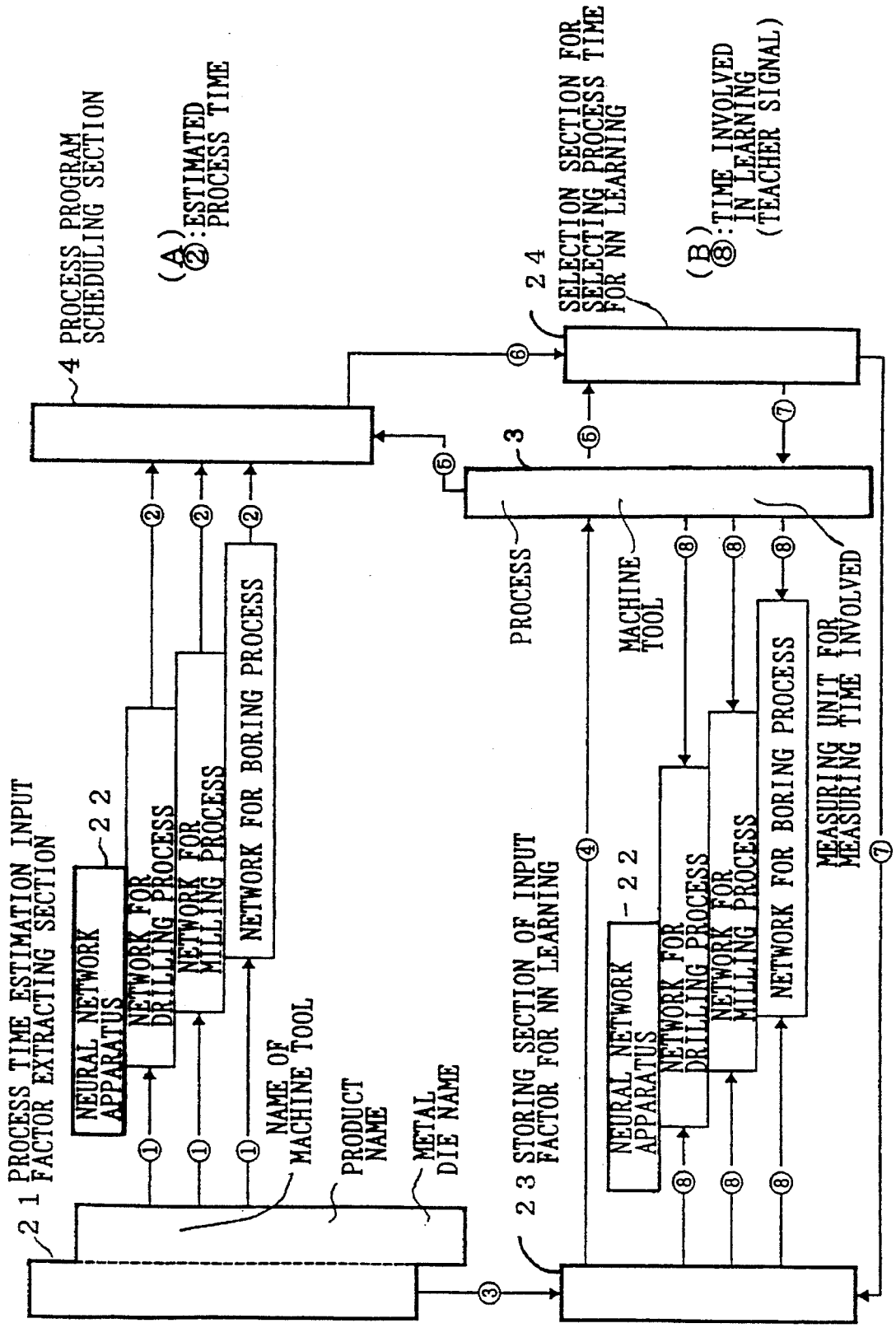
FIG. 6 shows a method for estimating the process time of a process time estimating apparatus for metal die manufacturing (A) and a method for learning the process time of a process time estimating apparatus for metal die manufacturing (B).

FIG. 6 shows the relation between the peripheral means section in learning means for learning the time taken by the process (machine tool) and the process time estimating means of the neural network apparatus 22. The numerals in figure are coincident with those of FIG. 5 and indicate the sequence of data communication. That is, the process time estimating input factor extracting section 21 receives the process code names and the drawing information from the process planning section 1 and converts the drawing information classified as the drilling process, milling process and the boring process into factors for inputting to the neural network. The section 21 extracts the converted classified drawing information and inputs these extracted information to each process network of the neural network 22 along with the names of the process codes indicating the names of the optimum machine tools, product names and metal die names derived by having reference to the loading state of the machine tools indicated in the process program scheduling section 4. Each process network 22 deduces estimated time of minor error derived from operating the learned network functions and transmits the estimated results to the process program scheduling section 4. The scheduling section 4 displays and stores the received process code names and the estimated time on estimation columns of the machine tool.

On the other hand, the process time estimating input factor extracting section 21 transmits the process code name and the drawing information converted and extracted as neural network input factors. The process code names and neutral network input factors are transmitted (3) to the storing section of input factor for neural network learning 23. The storing section 23 which has received the drawing information stores them until the process code names and learning enable/disable signal are received. The process occupancy time measurement section 3 for measuring the time involved in the process (machine tool) receives the process code name and the name of the machine tool from the storing section of input factor for neural network learning 23 to measure the time taken by the machine tool in connection with a metal die bearing the process code name. Subsequently, the process code name, the machine tool name and the time taken by the machine tool are sent to the process program scheduling section 4 and to the selecting section 24 for selecting the process time for neural network learning (the teacher signal). The process program scheduling section 4 receives the process code names and the time taken by the machine tool from the measurement section 3 to indicate the process code names and the time taken by the machine tool in the result column of the machine tool name. The selecting section 24 receives the process code names, the machine tool name and the time taken by the machine tool to transmit the received process code name and the machine tool name to the process program scheduling section 4, while receiving the estimated time of the process of which code name is stored in the estimation column to give judgment as to whether learning is or is not possible. The learning enable/disable signal is then sent to the storing section of input factor for neural network learning 23 along with the process code name and to the process (machine tool) occupancy time measurement section 3 along with the actual dedicated time. In case of the learning enable signal, the storing section of input factor 23 sends the drawing information of the process code name to learning means of the neural network, while the measurement section 3 for measuring the time taken by the machine tool sends the actual occupancy time to the same learning means. The learning is executed in neural network 22. In case of the learning disable signal, the storing section of input factor 23 and the measurement section 3 delete the drawing information for the process code name and the actual occupancy time.

Advantages of Embodiment 1

During the time when data are transmitted from the process planning section 1 to the operation planning section 9 and converted into NC data for machining in order to proceed to actual machining, it becomes possible for the process time estimating section 2 to present the accurate process time based on learning means of the neural network 22. This enables process program scheduling to be formulated quickly to render it possible to grasp and anticipate the loading states of the machine tools in the manufacturing plant at an earlier time and to draft a plan of labor control and scheduling of delivery in a contracted term. As a consequence, wasteful expenses necessarily involved in preparation of varied product single item metal die may be saved to reduce costs for manufacturing the metal dies.

If attention is directed to the construction of the learned network, it becomes possible to construct the network so as to adapt itself to the variance of the load on the manufacturing plant :caused by social changes. Besides, the learned network may be controlled in accuracy, that is, the estimation accuracy may be controlled, by the provision of the selecting section for selecting the time involved in learning (the teacher signal) to render it possible to draw a plan for process program scheduling.

Figure 8:
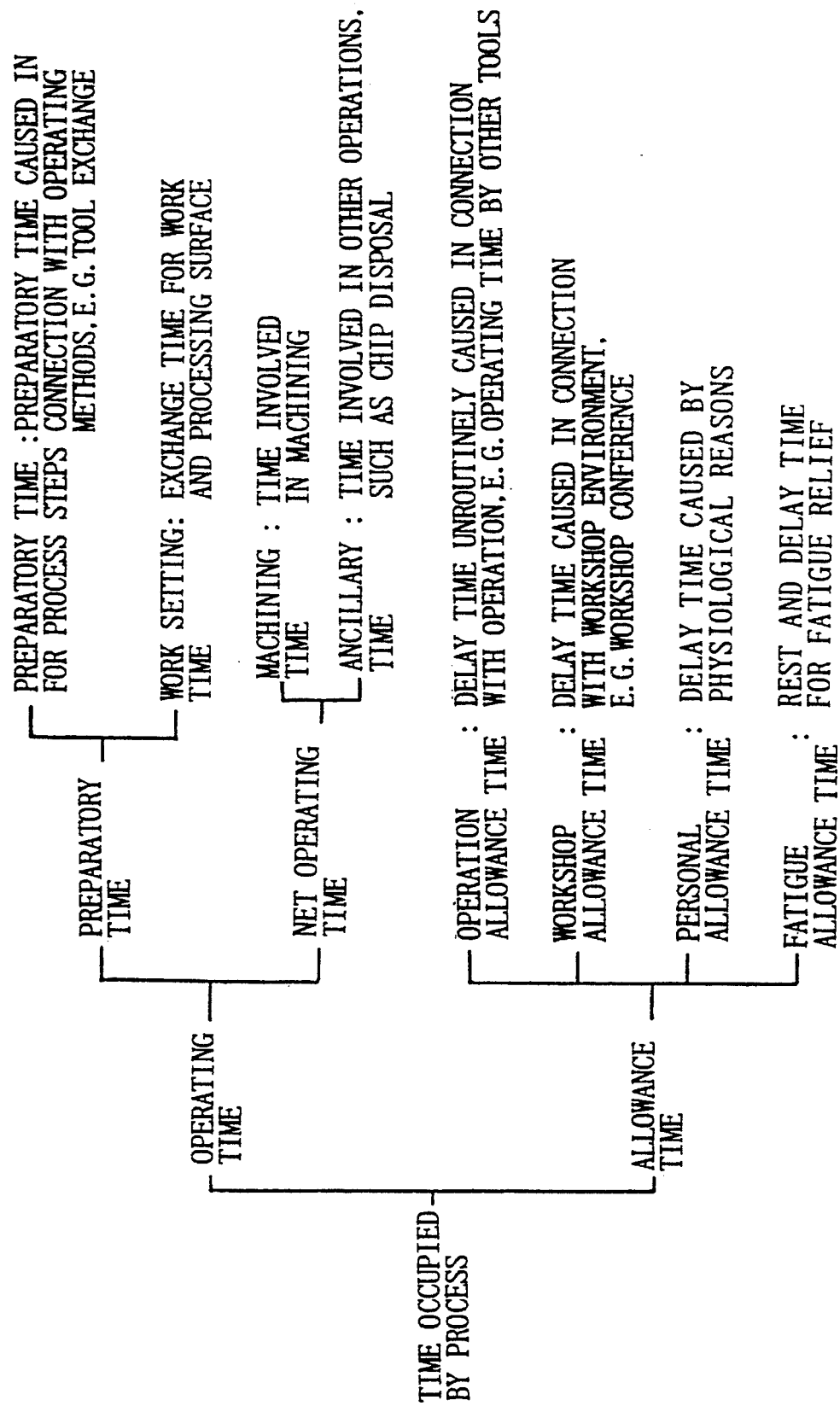
FIG. 8 shows details of the time involved in processes during metal die manufacturing.

In more detail, factors such as drawing information or the names of machine tools employed are entered to the process time estimating apparatus consisting of a back-propagation type or interconnection type neural network and learning is carried out as the process time taken by the process is entered from the output element. As shown in FIG. 8, the process time taken is a total time since delivery of the metal die into the machine tool until end of the process to proceed to the next process. That is, the time involved in the process is classified into the operating time set for carrying out the operation and into the allowance time which is a time delay inevitably caused during the operation. If the operating time is classified into the preparatory time and the net working time, the preparatory time is the operating time for carrying out a preparatory operation for metal dies and the post-operation time. Meanwhile, the drawing information adopted as an input factor is equivalent and proportional to the net working or operating time.

The time involved since a material is delivered to the manufacturing plant and transported from it in the form of a product may be estimated by summing the time involved in each process, which may be obtained in accordance with the present invention. That is, each drawing information and the names of manufacturing means (machine tools) are entered at the time of formulation of the drawings, using the estimated process time learned for each process, for estimating the time involved in the process, and the time is calculated to clarify the data of completion of the product. This assures scheduling by the plant manager and operators towards delivery of the product within the contract term.

Meanwhile, in the case of the interconnected type neural network, the state quantities $XI^+$, $XO^+$ of the input and output elements in the learned state are computed to derive the state quantity $XII^+$ of the hidden element. Then, only one input factor is entered, with the remaining elements being set free, to compute the anti-learning state to find the status quantity $XH^-$ of the hidden element and the status quantity $XO^-$ of the output element for the status quantity $XI^--XI^+$ of the input element. This sets the status quantities of the input, output and hidden elements during learning and anti-learning to find the quantity of correction of learning. This corrects the coupling coefficients between neuron elements concerning the input factors to find the converged coupling coefficients from execution of the error evaluation. The input factors showing negative input factors are deleted. That is, the input factors unnecessary for estimating the process time are deleted and the factors indicating positive coupling coefficients are entered using the learned process time estimating apparatus to estimate the process time to conceive the estimated value with a high reliability.

Embodiment 2

Figure 9:
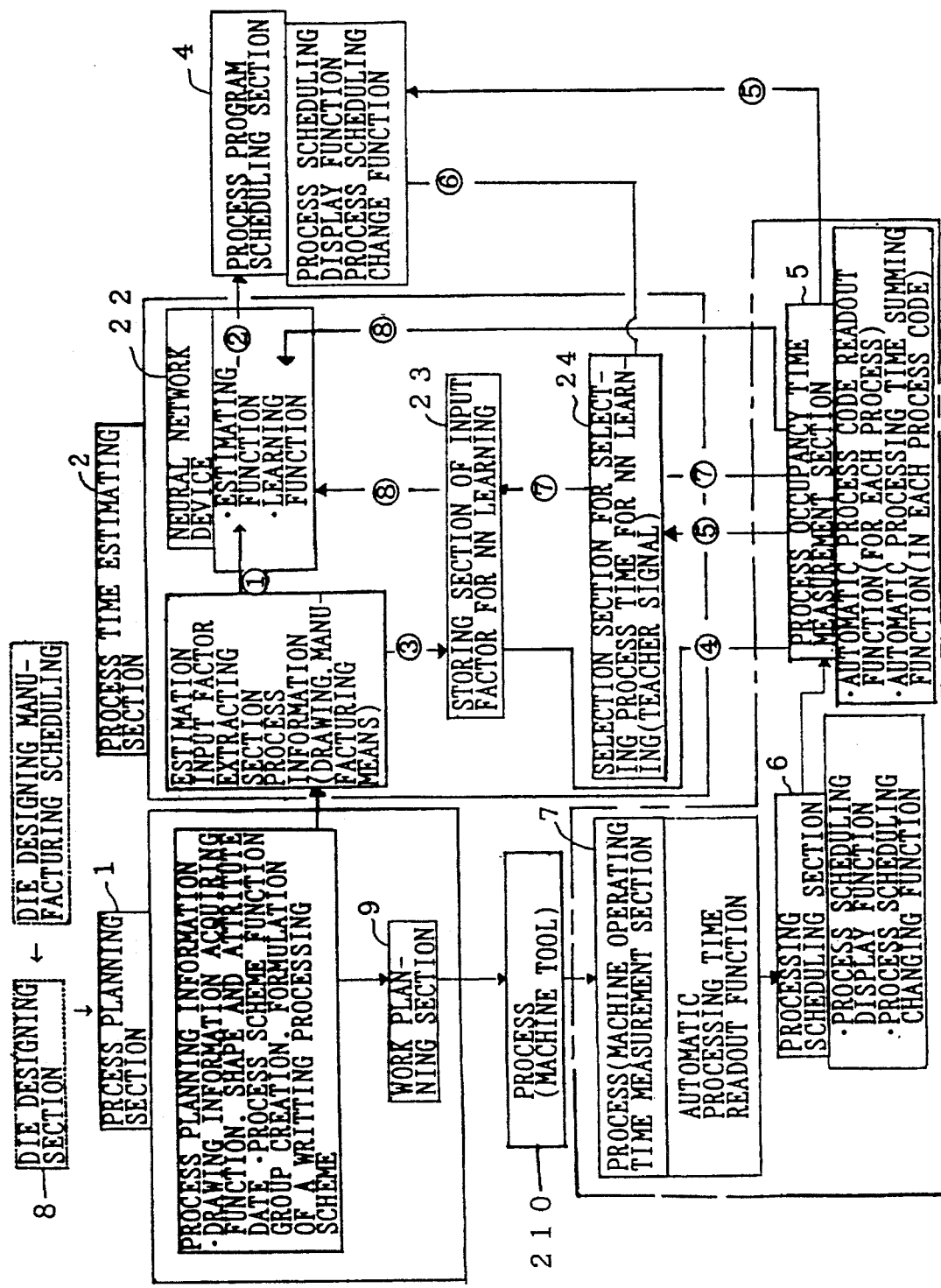
FIG. 9 shows a constructional view II of a process time estimating apparatus for metal die manufacturing.

FIG. 9 shows, in a conceptual view, a second embodiment of the process time estimating apparatus including a neural network having process time estimating and learning means. The feature of the present embodiment resides in the method of computing the process machine operating time of the teacher signal employed in the learning means of the neural network device. For achieving these means, a process (machine tool) operating time summing section 5, a process (machine tool) operating time measurement section 7 and a processing scheduling section 6 are provided in place of the process occupancy time measurement section 3 to receive the process code name and machine tool name sent from storing section of input factor for neural network learning 23 to read the process code name entered in the processing code transmitted from the processing scheduling section 6 to sum the operating time transmitted simultaneously, in case of coincidence of the process code names. The process (machine tool) operating time summing section 5 transmits the summed operating time bearing the same process code name to the selecting section for selecting the process time for learning (the teacher signal) 24 and to the process program scheduling section 4. The process (machine tool) operating time summing section 5 receives the learning enable/disable signal from the selecting section 24 and transmits the summed operating time to learning means o the neural network device 22 in case the learning is possible and deletes the summed operating time in case the learning is not possible.

Figure 10:
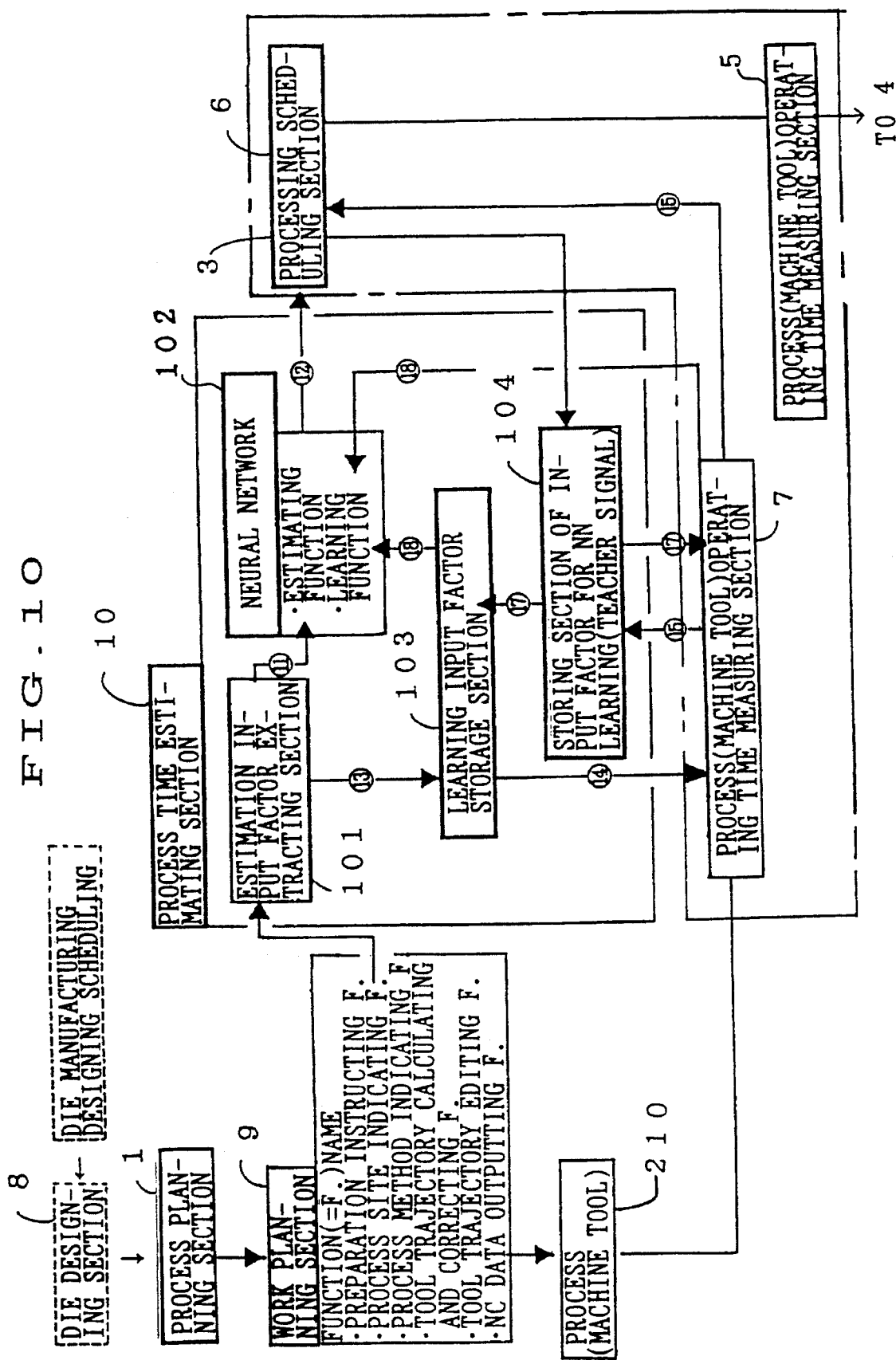
FIG. 10 shows a constructional view showing process time estimation by a process time estimating apparatus for metal die manufacturing.

As a modification of FIG. 9, the processing scheduling section 6 shown in FIG. 10 receives the processing time estimated by the neural network 102 within the processing time estimating section 10 (corresponding to the process time estimating section 2 shown in FIG. 5) from the neural network 102 along with the processing code name and puts them in its estimation column of the machine tool (manufacturing means), while receiving the processing code name, (further machine tool name) and the actual processing time from the process (machine tool) operating time measurement section 7, putting the processing code name and the operating time in the result column of the name the same machine tool (manufacturing means) and transmitting them to the selecting section for selecting the the process time for neural network learning (the teacher signal) 104. In FIG. 10, the numerals in arrows indicate the sequence of data communication similarly to the numerals used for estimating the process time. Besides, the processing code name to be received newly and the estimated time are selected for indication from comparison of time of the process name indicated in the result column and in the estimation column so that the difference between the estimation column and the result column will be minimum.

The processing time estimating section 10 is made up of an estimation input factor extraction section 101, a neural network 102, a storing section of input factor for neural network learning 103 and a selecting section 104 for selecting process time for neural network learning (the teacher signal), each section having the same function as that enclosed in the process time estimation section 2.

In FIG. 10, the work planning section 9 receives the process code name, shape data and attributes data from the process planning section 1, classifies the shape data and the attributes data for each of the processing sites to add the processing sequence number at the last part of the process code name to formulate a processing code name, which is transmitted along with the classified shape data and attributes data to an estimation input factor extracting section 101 in the processing time estimation section 10. (It is noted that the work measurement section 9 may be provided as a part of the process planning section 1 as shown FIG. 5).

Advantages of Embodiment 2

Scheduling with each NC tape as a unit becomes possible by provision of the process scheduling section 6 and the operating load condition of each machine tool can be grasped accurately by comparison with the indicated contents of the process program scheduling section. This assures facilitated labor management and control of the loaded state of the machine tools in the manufacturing plant from the hourly basis to the monthly basis to assure management of a metal die manufacturing plant with a high efficiency.

EXAMPLES

Example 1 (corresponding to Embodiment 1)

The Examples of the invention will be explained by referring to the drawings.

Figure 11:
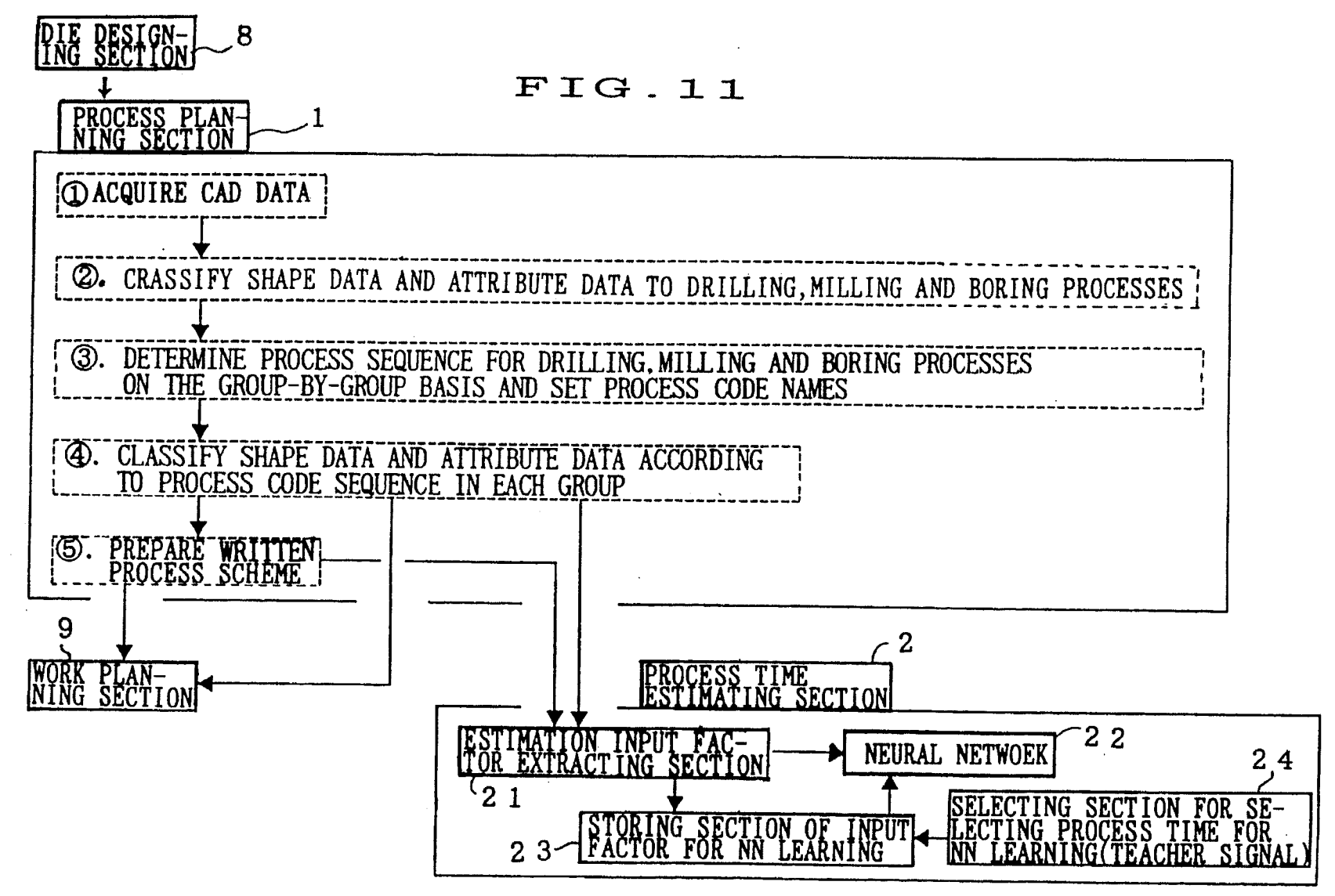

The process planning section 1, receiving drawing data (CAD data) from the die designing section 8, displays the CAD data on CRT. Then, as shown in FIG. 11, the process planning section 1 classifies the CAD data displayed on CRT into shape data and attributes data according to the drilling process, milling process and boring process. The process planning section 1 sets the process sequence numbers according to the process groups to set the process code names consisting of the product name, product number, die name and the process serial number, while classifying the data into the shape data and attributing data according to the process code name. The process planning section also transmits the processing schedule shown in FIG. 12 to an estimation input factor extracting section 21 in the process time estimating section 2, while transmitting the shape data, attributes data and process code name to the work planning section 9 after conversion of the estimating input factor.

Figure 13:
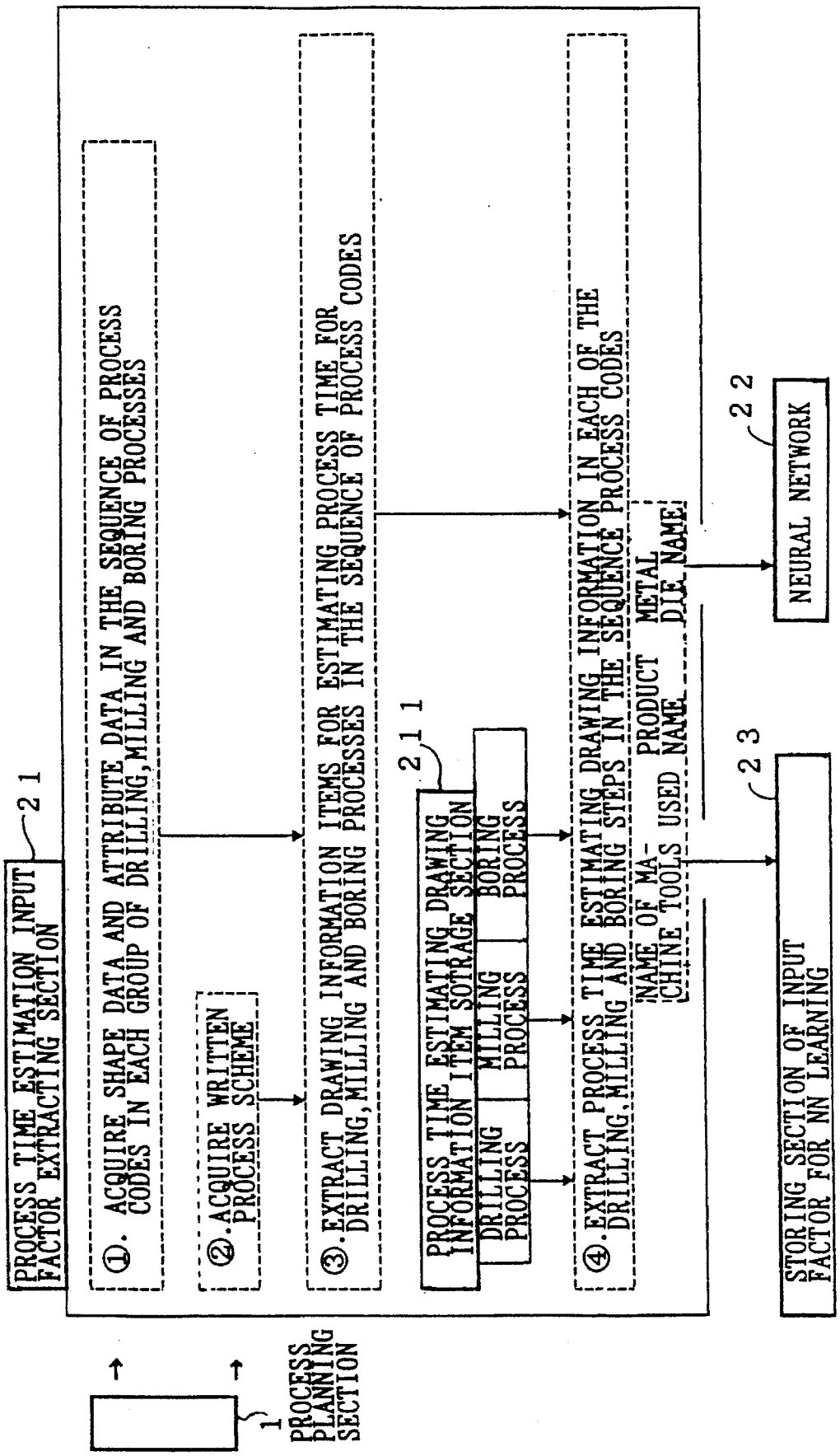
FIG. 13 shows a flow chart for an input factor extracting section of a process time estimating apparatus for metal die manufacturing.

The estimation input factor extracting section 21 has means shown in FIG. 13 and includes a process time estimating drawing information item storage section 211. The extracting section displays the process code name and the related shape and attributes data from the process planning section 1 on CRT to extract the process time estimating drawing information items. The extracting section also contrasts the process time estimating drawing information items received from process time estimating drawing information item storage section 211 with the extracted drawing information items for extracting the process time estimation drawing information for each process code name. The process code name and time indicated in estimation and result columns of display means owned by the process program scheduling section 4 (CRT or display board with lamp) are read in the extracted process time estimating drawing information and the names of the optimum machine tool for scheduling are selected to transmit the selected machine tool name along with the process code name to the estimation means of the neural network 22 and to the storing section of input factor 23 for neural network learning (the teacher signal). The contents of the process time estimating drawing information item storage section 211 enclosed in the estimation input factor extracting section 21 are shown in FIG. 14. The items of the drawing information of each process are hereinafter explained in detail.

Drilling Process

The drilling process required in metal die processing includes drilling, gun drilling, reaming, tapping and counterboring. Examples of classification of holes formed by drilling include holes for cooling water conduits, holes for lubricant conduits, holes for holding components of the dies, holes for positioning pins during metal die operation, clearance holes for pins of holding components, clearance holes for positioning pins, holes for extrusion pins for product take-out, clearance holes for extrusion pins for product take-out and holes for reference pins for size setting during processing. Examples of the information obtained from the drawing during the processing include the number, overall length and dimensional tolerance of the respective holes. Among these, the dimensional tolerance of the holes may be obtained if the kinds of the tools employed, the kinds of the resining die or casting die and the name of the metal die, such as movable die or the fixed die are set, so that substitution may be made by inputting the names of the products produced by the metal dies and the metal dies. The allowance time bands produced in each step outside the net machining time shown in FIG. 8 are produced in the gap time bands such as the preparatory time for metal dies or during tool exchange. Based on this fact, the number of kinds of the drilling operations necessary in each step, for example, are adopted with the factors produced by these gap time bands as input factors. The machine tools employed in the drilling process are varied and include NC machines, profiling control machines, general-purpose drilling machines, NC drilling machines or milling machines. The drilling performance differs from one machine to another so that difference is necessarily produced in substantial machining time, preparatory time and chip disposal time. It follows from this that the name of the machine tool employed needs to be inputted as input factor. (It is noted that the name of the machine tool employed and the name of the metal die are entered by symbols and the coupling coefficient or weighting factor are determined by the input frequency N.) In the case of reamer processing, a pin reaming operation for lifting an input or a pin reaming operation for extracting a core is carried out to make it easier to take out the product after molding. During metal die processing, reaming processing for reference pin, as a reference for each processing coordinate values, require long processing time and high skill. Similarly, for manufacturing a complex product shape, reaming processing for a pin of extrusion cores required for providing an undercut shape for resining dies, reaming processing for a pin of core extraction for casting dies and reaming processing for a pin of product extrusion in forging dies similarly require long processing time and high skill.

Milling Process

In the manufacturing of metal dies, the sites of the metal dies for forming product parts are usually processed by an milling process. The objectives of milling differ for each process of rough machining, medium finishing machining, finishing machining and superfinishing machining. That is, in the rough machining and medium finishing machining stages, a great deal of the volume of the material is removed for roughly completing the shape of the product part. On the other hand, as for the finishing machining and superfinishing stages, there are occasions wherein the character of a design, that is a mirror-like surface indicative of low roughness and characteristic fine grooves or flutes, is required of surface properties of the front surface of a product obtained from the resining die or the press metal die. Similarly, in the case of the casting die, for achieving product functions, a product surface having characteristic fine grooves etc. may be required. This means that superfinishing machining may be required of the milling stage for manufacturing the front surface of the product and hence the corresponding NC processing method or high precision model sand processing machines for tracing machining are necessitated. There is required a comparable finishing machining technique for manufacturing a finished surface during the manufacturing of the reverse side of the product part. For this reason, the drawing information to be inputted to the neural network has to be divided into a group for rough machining and medium finishing machining stages and a group for superfinishing machining stages. It is noted that the items common to both groups include the names of the machine tools employed, processing stages (rough machining, medium finishing machining, finishing machining and superfinishing machining), and the names of metal dies, such as a die for the front side of the product (fixed die) or a die for the reverse side of the product (movable die). Division into the forging die, casting die, resining die and press metal die is achieved by inputting th product name. Since the time taken differs with the numerical control (NC) and tracing machining (TC machining), both of these need to be inputted as the machining method.

It is the product drawing which characterizes the size and the shape of the product part, which in turn influence the length of the time involved in the milling process. To this end, the drawing information to be inputted to the neural network needs to be read from the product drawing and converted into quantitative values which are proportionate to the time involved in the milling process. As a first step for these measures, in view of the fact that, due to the characteristics of the product shape, there occurs a physical conflict between the machining tool and the metal die or between the machine tool in use and the metal die, so that it becomes necessary to prevent this by changing the protruding length and shape of the machining tool. Thus, the product shape is divided into a flat section, an upwardly directed wall section, a downwardly directed wall section and an upstanding transverse wall section, on the basis of the three-side drawings (plan view, side view and a front view) of the product part. In dividing the product shape into the upstanding wall sections and the flat part, the positions with a rise angle of 60° are read from the three side views for division into the upstanding wall sections and the flat part, in view of the fact that the physical conflict between the metal die and the main spindle part of the machining tool or the machine tool in use occurs at the upright wall sections having a predetermined angle (about 60°). Referring more precisely to the division into the upstanding wall sections and the flat part, for division into the flat part and the upstanding wall sections, the site having an angle of 60° or more with respect to the flat part when seen on the plan view is to be the upstanding transverse wall section, whereas, for division into the flat part and upper or lower upstanding wall sections, the site having an angle of 60° or more with respect to the flat part when seen on the front cross-sectional view is to be the upstanding wall section.

Since the value of the area to be machined during rough machining and medium finishing machining stages aimed at rough formation of the product size is proportionate to the time taken by the machine tool which is in use, the transverse and longitudinal lengths of the flat part, transverse upstanding wall section, upright extending wall section and the downwardly extending wall section are read. The transverse and longitudinal length are read on the plan view and on the front cross-sectional views, respectively. On the other hand, during the finishing machining and superfinishing machining stages for manufacturing an accurate produce shape, a pick feed is small so that the longitudinal length/transverse length ratio of each site to be machined needs to be inputted to the neural network. Besides, for preventing possible physical conflict between the machining tool or the machine tool in used at a boundary region between the flat part and the respective upright wall sections, the protruding length or shape of the tool need is to be changed. In these cases, the feed rate of the tool is necessarily changed and the time taken becomes variable in proportion to the protruding length or the protruding shape. That is, if the transverse or longitudinal length of each upstanding wall section is longer than the transverse or longitudinal length of the flat part, the extent of tool protrusion is increased, so that the feed rate of the tool is lowered to prevent the occurrence of machining tool vibration during machining. For reading the above from the drawing information, it suffices to direct attention to values of the (transverse length of transverse upstanding wall section)/(transverse length of the flat part) ratio, (longitudinal length of the downwardly extending wall section)/(longitudinal length of the flat part) ratio, (longitudinal length of downwardly extending wall section)/(longitudinal length of flat part) ratio, etc. On the other hand, for achieving design and functional features of product surfaces, fine grooves and upstanding walls of each upstanding wall section, such as upstanding walls of the flat part or upstanding walls of the transverse upstanding wall section, are milled. Since these characteristic shapes require much time during the milling process, they need to be read as the drawing information to be inputted to the neural network. Since the number of the flutes and the overall length of the flutes need to be taken into account in the case of the flutes, whereas, in the case of the upstanding wall in each section, possible physical conflict between the sections and the machining tool employed in milling the upstanding wall sections needs to be taken into account, the value of the (height of the upstanding wall)/(longitudinal or transverse length of the sections) is adopted.

When manufacturing a product from a metal die, a parting line is set for holding a workpiece in the case of a press die for preventing burrs from being produced at a mating face between the fixed die and the movable die. Since the parting section is milled at this time with a uniform width around the metal die used for manufacturing the product, the area of the parting section is proportionate to the size of the product. A cotter section is formed outside of the parting section. The cotter section is a section where the operation of the die structures of the fixed and movable dies is added. A die structure function section is formed by the boring process. Consequently, similarly to the parting section the cotter section is proportionate to the product size. However, the cotter section is wider in area than the parting section.

At an outer periphery of the product part, the quantitative value to be inputted as the drawing information for the parting section is (transverse length of the flat part+transverse length of parting section)×2 (:both ends) or (longitudinal length of flat part+longitudinal length of vertically upwardly extending wall section+ longitudinal length of vertically downwardly extending wall section)×(width of the parting section)×2 (: both ends). The value of (transverse length of flat part+ transverse length of transverse upstanding wall section+ longitudinal length of flat part+longitudinal length of vertically downwardly extending wall section)×(width of parting section)×2 may also be employed. If one of these methods is selected as a unified method, the method becomes a proper inputting method for the parting area of the metal die manufacturing company employing the process time estimating apparatus of the present invention. Besides, there are occasions wherein the parting section of a gap region within the product part is necessitated by reason of the product shape. In such case, the value of (entire periphery of the gap region within the product)×(width of the parting section) is added to the above quantitative value.

Similarly, in the case of the cotter section, the quantitative value may be (transverse length of flat part+ transverse length of transverse upstanding wall section)×(constant)×2 (: both ends), (transverse length of flat part)+(longitudinal length of upwardly extending wall section)+(longitudinal length of downwardly extending wall section)×(constant)×2 (: both ends) or (transverse length flat part+transverse length of transverse upstanding wall section+transverse length of flat part)+ (longitudinal length of upwardly extending wall section)+ (longitudinal length of downwardly extending wall section) ×(constant)×2, corresponding to the overall periphery of the product. The constant is multiplied to procure an area necessary for adding a die structure in the metal die and assumes a value which is variable depending on the types of the forging, casting, resining and press dies.

Boring Process

In order for the fixed and movable metal dies to exhibit the respective functions for manufacturing a high quality product, die structure sections need to be produced for both dies by the boring process. The boring process consists of boring and groove cutting. Besides, reference surface machining, necessarily required during machining the fixed and movable dies, are also carried out. These processes may be roughly divided into surface machining, boring and groove cutting. Since these machining operations require a highly advanced processing technique, the time taken by machine tools and for products are different. Consequently, the time involved in machine tools and products is entered to the neural network. The names of the metal dies are also entered because these occasionally require different degrees of accuracy in the course of the boring process.

Milling is frequently employed for surface machining. The reference surfaces along x-, y- and z- axes, required at the time of metal die processing, are first produced. In addition, a pressure-receiving surface is produced. This surface, is required for the reason that the fixed metal die and the movable metal die are mated during product manufacturing to prevent occurrence of burrs. Besides, for manufacturing a product with a complex shape or manufacturing an undercut, an inclined core for sliding a surface of the movable die is adopted as typical means, and hence a slide surface is produced in a portion of the movable die. General surfaces other than the functional surfaces are also machined. Machining of these various surfaces required prolonged time and high technical power, whilst an advanced preparatory technique is required during changeover from one surface to another. Based on the above fact, the number of kinds, number of machining operations and area to be machined in the reference surfaces, pressure-receiving surfaces or slide surfaces may be enumerated as the drawing information contributing to the estimation of the process time.

In the case of the resining die and the casting die, a pocket hole is produced by boring in the movable die of a gate section or an ingate for manufacturing a complex shape and for injecting molten metal, and a core is actuated. In the case of the casting die and the pressing die, a pocket hole for an insert die is bored at a site where abrasion resistance is required, or at a site where thermal resistance is required, or as when shearing is to be performed simultaneously with press working. Because of the multiplicity of the functions of the insert parts, various shapes of the pocket holes are proposed. The pocket holes are roughly classified as to their shape into a square hole with various corners and an oblong hole. The corners R of the square-shaped hole are variegated in shape due to the multifarious functions of the insert parts. By way of an example, a sole nest hole may have two different corners R, that is a corner 21R on the bottom side and a corner 22R on the inlet/outlet side. On the other hand, in the case of round and oblong pocket holes, the bottom surface is machined to round and oblong holes and a processing technique and processing time different from those in the case of the square-shaped pocket hole are required. Consequently, as the drawing information to be inputted to the neural network, classification into square-shaped, round and oblong pocket holes are adapted and, in the case of square-shaped holes, the number of kinds, number of times of machining and the total area of machining are also adopted, whereas the number of times of machining and the total area of machining are entered in the case of the round and oblong holes.

The number of kinds and the number of machining operations for grooves for interconnection of thermocouples are read from the drawing and entered into the neural network.

In the case of the resining die and the casting die, a core for forming a profiled portion known as undercut, as typical of a complicated product shape, is employed. For example, in the case of the resining die, a slide core or a tilted core is used for forming a product which is chevroned shaped from the front side to the back side of the product part in the resining die. These cores are classified into a round core, slide core, extrusion core and an extrusion tilt core, which are different in function and size because of different application and usage. The pocket holes for accommodating these cores are produced by boring or groove cutting. Since an advanced technique is required for groove cutting, the above-mentioned four types of the numbers of times of cutting and the total cutting area are used for the pocket holes for cores as input factors.

Figure 15:
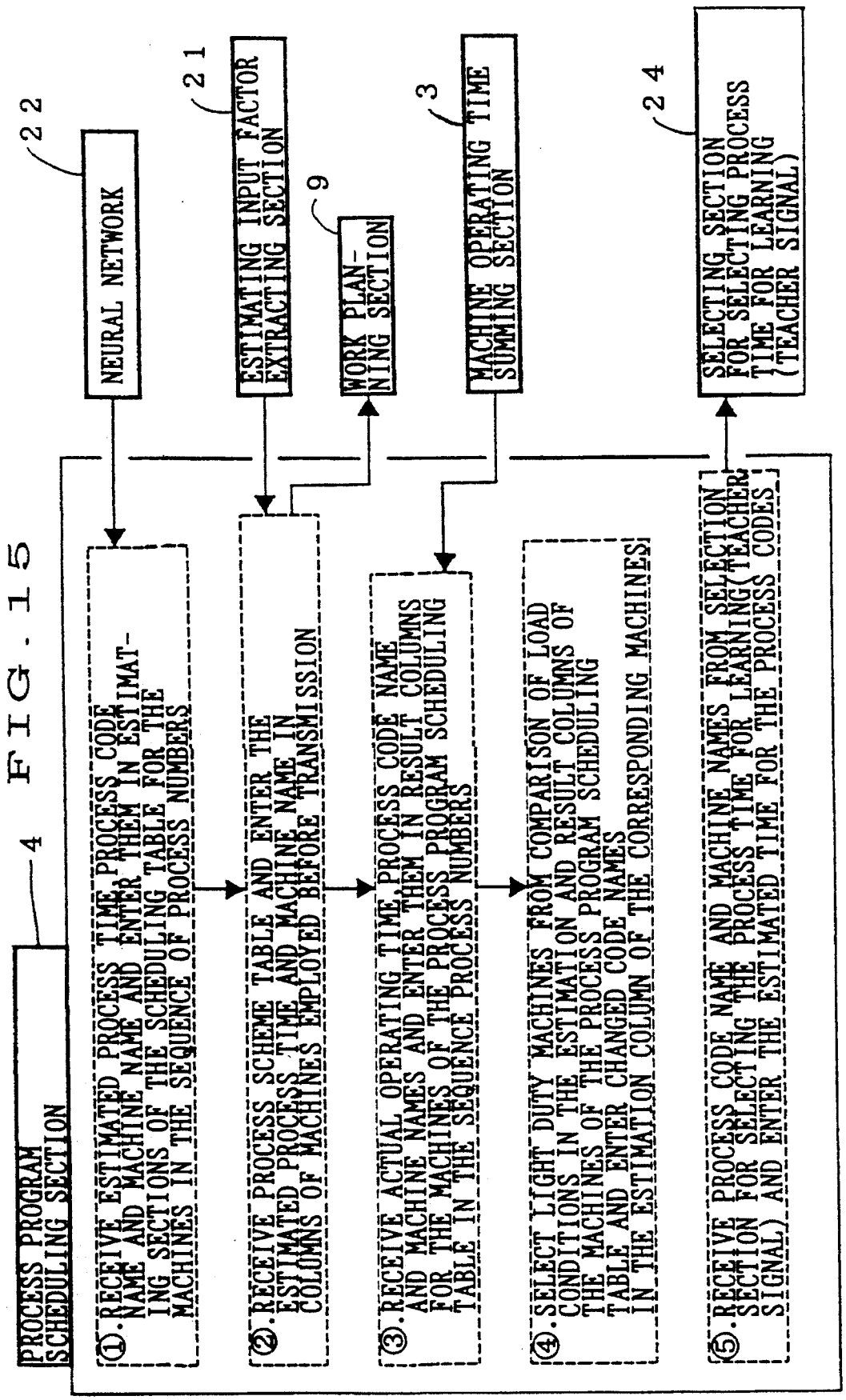
FIG. 15 shows a flow chart for a process program scheduling section of a process time estimating apparatus for metal die manufacturing.

The process program scheduling section 4 has the functions shown in FIG. 15 and receives the process time estimated by neural network 22 along with the code names to display the names of the process codes and the estimated time in the estimation column of the process program scheduling table displayed on CRT or display board with lamps shown in FIG. 16. On the other hand, the process program scheduling section 4 enters the estimated process time and the machine tool name in the scheduled date of execution column and the column for the machine tool in use, received from the estimation input factor extracting section 21, as shown in FIG. 17, to transmit the results of the entry to the process planning section 9. The process program scheduling section also receives the process code names, machine tool names and the time taken from the machine tool dedicated time measurement section 3 to put the process code names and the time taken in the estimation column of the process program scheduling table as shown in FIG. 18. The name of light duty machine tool is selected from comparison of the process code names and occupancy time taken as indicated in the estimation and result columns of the process program scheduling table on the display board with lamp or CRT shown in FIG. 16, and the process code name and the occupancy time taken are changed and put in the estimation column of the machine tool name. The process code name is also received from selecting section 24 for selecting process time for neural network learning (the teacher signal) and the estimated time is transmitted to the selecting section 24.

The storing section of input factor for neural network learning 23, having the functions shown in FIG. 19, receives from the estimation input factor extracting section 21 the process code names, drawing information and the names of the machine tools for storage and transmits only the process code names to the measurement section 3 for measuring the time taken by the process (machine tool). The storing section of input factor 23 then receives enable/disable signal for neural network learning of time taken by machine tool of each code name from the selecting section 24 for selecting process time for neural network learning (the teacher signals) and transmits the code names, drawing information and names of machine tools to learning means section of the neural network 22. If learning is disabled, the drawing information and the names of the machine tools corresponding to the process code names are deleted.

The process occupancy time measurement section 3 for measuring the time taken by the process (machine tool) receives the process code name from storing section of input factor for neural network learning 23, as shown in FIG. 20, to select the metal die bearing the process code name to measure the time taken by the machine tool. After measurement, the measurement section 3 transmits the process code name, machine tool name and the time taken by the machine tool to the result column indicating means of the process program scheduling section 4 and to the selecting section for selecting process time for neural network learning (the teacher signal) 24. The measurement section 3 then receives from the selecting section for selecting process time for neural network learning (the teacher signal) 24 the process code name, time taken by machine tool and enable/disable signal for neural network learning of time taken by the machine tool and, in case of the learning being enabled, transmits the time taken by the machine tool of the process code name to neural network 22. In case of the learning being disabled, the process code name and the time taken by the machine tool are deleted.

The selecting section for selecting process time for neural network learning (the teacher signal) 24, having the function shown in FIG. 21, receives the process code name and the time taken by the machine tool from the measurement section for measuring the time taken by the machine tool. The selecting section 24 transmits the process code name and the machine tool name to the process program scheduling section 4 from which it receives the process code name and the estimated time. The selecting section 24 then checks to see if the time taken is within a range of 80 to 120% of the estimated time and, if it is within the range or outside the range, the selecting section 24 transmits to the storing section of input factor for neural network learning (the teacher signal) 23 the enable signal or disable signal of neural network learning of involved time respectively, along with the process code name. These signals are also transmitted, along with the time taken, to the selecting section for selecting the time taken by the process (machine tool) 3. The limiting values of the ratio of time taken to the estimated time in the selecting section for selecting the process time for neural network learning (the teacher signal) 3 are not necessarily 80 to 120% but may be any value indicating the range of possible optimum scheduling in the process program scheduling section 4.

Judgement as to Whether Learning in Selecting Section of Process Time for Neural Network Learning is to be Executed Referring to FIG. 2, the metal die processing information, such as the machine tool name, metal die name, product name, drawing information (metal die shape, number of holes etc.) is entered into neural network NN and an output value A of the neural network is found. On the other hand, the time actually taken by the machine tool in connection with the metal die under the same processing conditions B is found and the following steps are taken:

(i) Learning is carried out if the difference between A and B is not more than ±20% and $W_{1-n}$ is changed so that A equals B.

(ii) If the difference between A and B exceeds 20%, it is indicative of a case in which the chip is broken or the operator has failed in installing the machine tool so that B assumes an abnormal value. In this case, learning is not carried out.

(iii) If A=B, learning is naturally unnecessary and if suffices to estimate the process time directly at NN.

Besides, it is possible with the present system by NN to cope with changes in time taken by machine tools in connection with actual metal dies.

If, for example, the time taken by the machine tool for the metal die is 100 hours, and is changed at a certain time period to 90 hours, learning is carried out in NN to change $W_{1-n}$ so that the time taken is 90 hours. If the actual time taken is 105 hours, $W_{1-n}$ is changed so that the time of 90 hours is changed to 105 hours.

Example 2

The present Example correspond to embodiment 2 and the measurement section for measuring the time taken by the process (machine tool) 3 in Example 1 is changed to a machine tool operating time summing section 5. That is, the process (machine tool) operating time summing section 5, having the function shown in FIG. 22, receives the process code name and the machine tool name from the storage section of storing input factor for learning 23, while receiving the processing code name from the process scheduling section 6 until the process code name in the processing code transmitted from the process scheduling section 6 become coincident. The summing section 5 receives and sums the actual operating time from the process scheduling section 6 at a time point when it receives the processing code name bearing the same process code name.

The process scheduling section 6, having the function shown in FIG. 23, receives the processing time, along with the processing code name and the machine tool name, from a neural network for estimating the processing time 102, and displays the processing time along with the processing code name on a sign board with lamps or on a CRT belonging to the process scheduling section 6 shown in FIG. 23. Besides, the process scheduling section 6 receives actual processing time, derived by automatic processing time measurement means provided in the machine tool, from a measurement section of the process (machine tool) operating time 7 to put the actual processing time along with the processing code name in result column of the process scheduling section 6.

In the process time estimating apparatus of Examples 1 and 2, composed of the above-described components, an example of the process time estimating function and the learning function of the neural network 22 is herewith explained.

Figure 26:
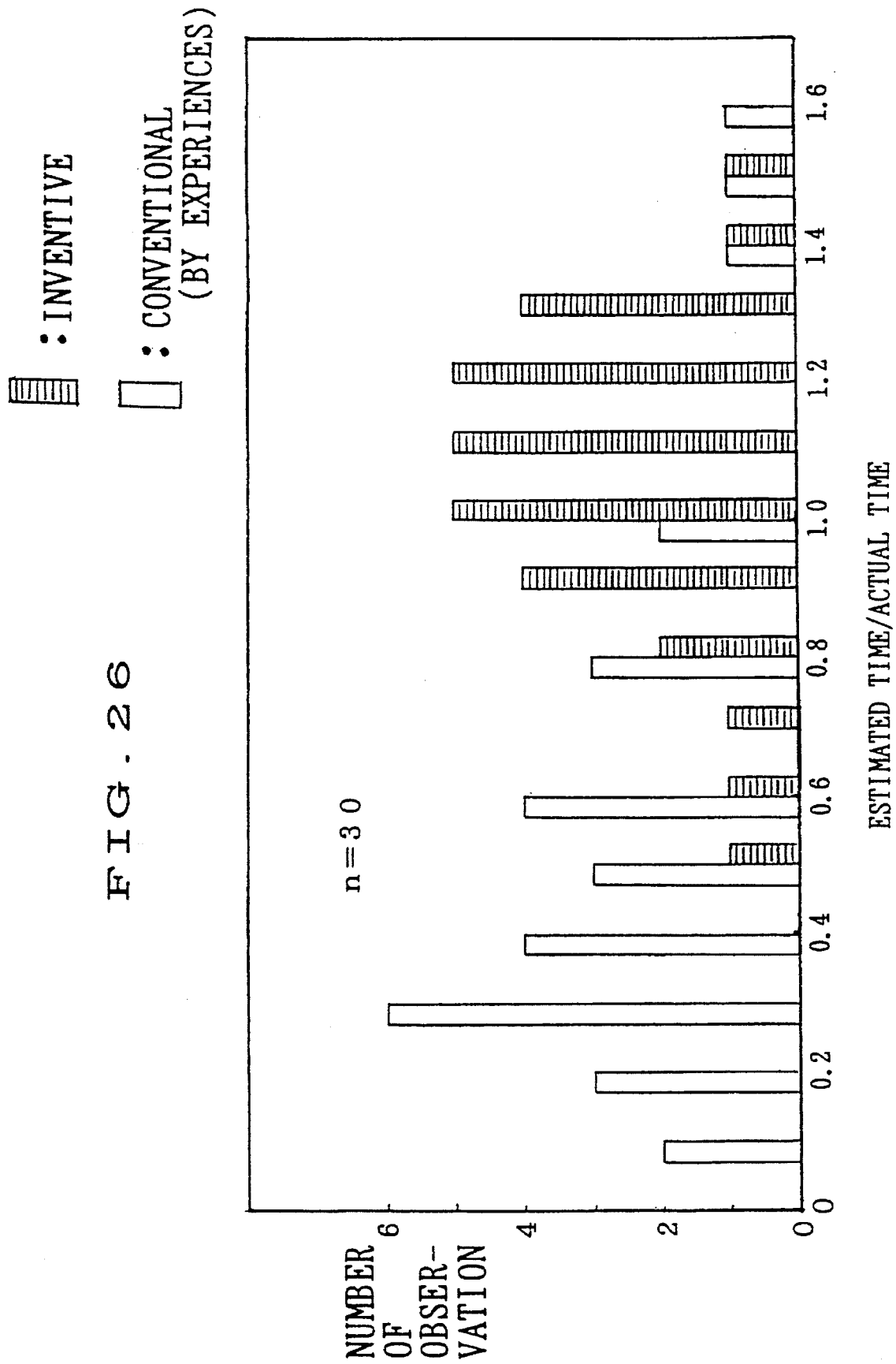
FIG. 26 shows a comparison between the empirical formula in estimating the metal die drilling process and the present method by the present process time estimating apparatus.

By way of an example of a drilling process, actual data shown as an example in FIG. 25 is entered into a back-propagation type or interconnection type neural network. The sum total of these 30 data is used, while the names of two machine tools, the number and the overall length of each drilled hole as well as the number and the overall length of bored holes inclined with respect to the reference surface, derived from the drawing information, were adopted as input factors. On the other hand, the time involved since installment of each metal die in the machine tool until dismounting from the machine tool after the end of operation was adopted as a teacher signal. Data was entered into the output neuron element side for learning of the neural network. For investigating into the performance of the learned network, the input factors were re-entered for each metal die to estimate the time involved in the process. The results are shown in FIG. 26, which shows good correspondence between the actual time taken and the estimated time, thus showing that satisfactory learning has been carried out by the neural network. The results of comparison with the conventional empirical formula indicate that the output value of the apparatus of the present invention has an estimated value of approximately 0.8 to 1.3 times the actual value, thus demonstrating improved accuracy of the present method as compared to the conventional method.

The drawing information of five new metal dies and the names of machine tools were entered to the learned neural network for estimation of the time taken and the resulting estimated time was compared with the actual time taken for machining. The results are indicated by black marks in FIG. 27. The input factors were the five kinds of the drawing information, including two names of the machine tools, as shown in FIG. 28. The time taken, as estimated from the neural network, shows good coincidence with the actual time taken, as shown in FIG. 27.

Figure 30:
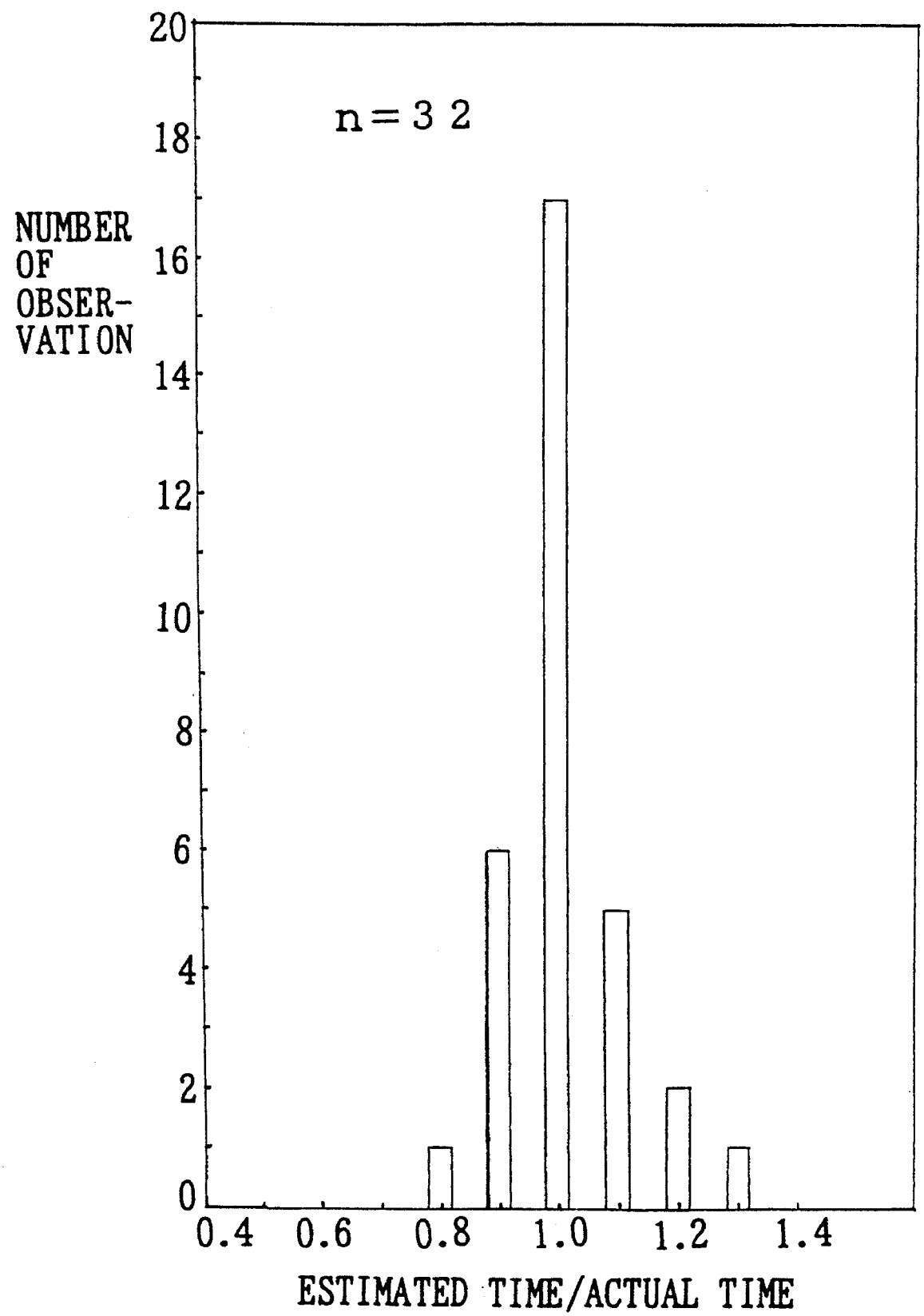
FIG. 30 shows an example of verification of a process time estimating apparatus in estimating the metal die milling process time.

An example of the drawing information, inputted during the milling process, is shown in FIG. 29. It is seen that 32 instances, with the use of a vertical milling machine, with the kinds of the drawing information being ten, the kinds of the metal dies being two (fixed metal die and movable metal die), the kinds of the machining stages being four (rough machining, medium finishing machining, finishing machining and superfinishing machining), with the kinds of machining tools being 12, have been inputted to the neural network, and each time taken was supplied as a teacher signal to the neural network to produce the learned states. For investigating into the performance of the learned neural network, the input factors were re-entered from one metal die to another to verify the estimated ability of the actual time taken by the process. The results are shown in FIG. 30. It is seen from the two figures that the ratio of the estimated time taken to the actual time taken is in a range of from 0.9 to 1.2 indicating good coincidence thus showing that learning has been carried out satisfactorily. Meanwhile, the drawing information of five new metal dies, names of the machine tools, names of metal dies, machining methods (TC or NC), the machining stages and product names were entered into the learned neural network for estimating the time taken and the resulting estimated time taken was compared with the actual time taken after machining. The results indicated values which were within a range of 0.9 to 1.2 times the value shown in FIG. 30.

As for the boring process, arbitrary drawing information was inputted to the process time estimating apparatus of the present invention and the estimated time was obtained with higher accuracy as in the case of the drilling and milling processes.

Alternative manufacturing processes, corresponding to Examples 1 and 2, include discharge processing, welding, coating, heat treatment and assembling processes, in addition to the above-described machining process for metal dies. In such a case, the process time estimating input factor extracting section 21 extracts the rough finishing processing stages, area of processed sites, material quality or type and overall length of flutes etc. for the discharge processing process, the overall length of processed sites, the material quality or type and the total number of times of processed sites for welding and the number of kinds, the total number of times and the total area of processed sites for coating and heat treatment. The extracted data is transmitted to the neural network 22. The number of assembled components, mounting accuracy, trial products, supplied components and purchased component and the total number thereof, are involved in the assembling process.

It is noted the term "machine tool" is sometimes abbreviated to read simply "machine", particularly in the Drawings.

It should be further noted that the embodiments herein disclosed are intended to provide illustrations of the invention. Modifications may be made without departing from the spirit and scope of the present invention as defined by the following claims.

What is claimed is:

1. A process time estimating apparatus for estimating the process time for manufacturing an object comprising a process time estimating section, a process occupancy time measurement section and a process program scheduling section, wherein said process time estimating section comprises:

a neural network device for estimating process times for individual machining operations to be performed in a planned process for manufacturing the object;

an estimation input factor extracting section for extracting estimation input factors including drawing information and manufacturing equipment identification for each machining operation to be performed on the object from process planning data associated with said object;

a storage section for storing input factors obtained from said estimation input factor extracting section and for transmitting said input factors to said neural network device for neural network learning; and a selecting section for selecting an actual time measurement for individual machining operations to be applied to said neural network device for neural network learning, wherein said process occupancy time measurement section reads a process code for each machining operation process and automatically makes an actual time measurement for the process corresponding to said process code wherein said selecting section makes its selection by determining if the actual time measurement is within a predetermined range of the process time estimated by the neural network device, and wherein said process program scheduling section receives output information from the process occupancy time measurement section, stores an estimated process time outputted from the neural network device, outputs estimation time data for each machining operation to said selecting section and outputs an updated estimate of the process time for manufacturing the object.

2. A process time estimating apparatus as defined in claim 1, wherein said process occupancy time measurement section comprises:

a process operating time measurement section for reading an operating time of manufacturing means for each process;

a processing scheduling section for displaying or modifying process scheduling responsive to an output of said process operating time measurement section; and a process operating time summing section for producing a process occupancy time responsive to an output of said processing scheduling section, said process operating time summing section inputting an output thereof to said neural network device as learning information.

3. A process time estimating apparatus as defined in claim 2, wherein said selecting section for selecting process time for neural network learning receives a processing code name and process time taken by a manufacturing means from the process operating time measurement section to transmit said processing code name to the process program scheduling section from which said selecting section receives an estimated time for said processing code name, and transmits a learning enable-disable signal to said storage section based on comparison of said estimated process time and actual time taken by the manufacturing means.

4. A process time estimating apparatus as defined in claim 3, wherein said selecting section for selecting process time for neural network learning transmits a learning enable signal or a learning disable signal to said storage section if said estimated process time is within the predetermined range or outside the predetermined range, respectively.

5. A process time estimating apparatus as defined in claim 4 wherein said predetermined range is 80% to 120%.

6. A process time estimating apparatus as defined in claim 1, wherein said process occupancy time measurement section reads a process code for each machining operation process step involving a manufacturing means.

7. A process time estimating apparatus as defined in claim 1, wherein said process occupancy time measurement section comprises a process operating time summing section, and a processing scheduling section and a process operating time measurement section for reading operation time wherein said process operating time summing section receives a process code name and a name of manufacturing means from said storage section and receives a processing code from said processing scheduling section until a time point when it receives a processing code name bearing the same process code name as said process code name from said storage section, receives and sums an actual processing time, and said processing scheduling section receives a processing time estimated by said neural network device located in said process time estimating section from said neural network device to put said processing time in an estimation column of manufacturing means along with said processing code name, receives a processing code name, a name of manufacturing means and an actual processing time from said process operating time measurement section to put the processing code name and actual operating time in a result column for the named manufacturing means, receives a processing code name from said selecting section for selecting process time for neural network learning (teacher signal) and transmits the estimated process time for a processing code name to said selecting section for selecting process time for neural network learning (teacher signal) as a process time information.

8. A process time estimating apparatus as defined in claims 1, 2, 6, or 7 wherein said process occupancy time measurement section transmits an actual time taken by manufacturing means to the neural network device in response to a learning enable signal transmitted from said selecting section for selecting process time for neural network learning.

9. A process time estimating apparatus as defined in claim 1 wherein a process planning section is connected to said process time estimating section and forms part of a distributed network.

10. A process time estimating apparatus as defined in claim 9, wherein said process planning section includes a work planning section, said work planning section classifying a drawing information according to processing sites to determine a processing sequence and transmitting a processing code name, said processing code name consisting of a process code name to which a processing number is added at a trailing end, to said estimation input factor extracting section in said process time estimating section along with said classified drawing information.

11. A process time estimating apparatus as defined in claim 9, wherein a manufacturing means is connected to said process planning section and said process occupancy time measurement section through data communication implemented by a distributed network.

12. A process time estimating apparatus as defined in claim 1 wherein said estimation input factor extracting section includes a drawing information storage section for process time estimation, said drawing information storage section classifies a machining operation into at least one of drilling, milling and boring subprocesses based on a drawing information and stores information comprising number of kinds of subprocesses, a total number of times each subprocess is to be performed and a required overall length of processing.

13. A process time estimating apparatus as defined in claim 12 wherein a drawing information stored in said drawing information storage section for process time estimation, comprises drilling process information, milling process information, and boring process information for estimating process time for manufacturing a metal die.

14. A process time estimating apparatus as defined in claim 13, wherein said drilling process information includes information selected from a group consisting of drilling processing, gun drilling processing, reaming processing, tapping processing, and counter boring processing, such information including: number of kinds of processing, number of times of processing, and total length.

15. A process time estimating apparatus as defined in claim 13, wherein said milling process information includes information selected from a group consisting of rough machining and medium finishing machining stages, and finishing and superfinishing machining stages, each information comprising a name of machine tool, processing stage, and a name of a metal die being manufactured.

16. A process time estimating apparatus as defined in claim 13, wherein said boring process information includes information selected from a group including at least surface machining, boring, and groove cutting, each information comprising reference surface, pressure-receiving surface, slide surface, and general surface, such information including: number of kinds of processing, number of times of machining, and total machining area.

17. A process time estimating apparatus as defined in claim 1 wherein said neural network device includes a back-propagation type network.

18. A process time estimating apparatus as defined in claim 1 wherein said neural network device includes an interconnection type network.

19. A process time, estimating apparatus as defined in claim 1, wherein said process occupancy time measurement section comprises:

a process operating time measurement section;

a processing scheduling section functioning as estimating means, said processing scheduling section being connected to an output of said neural network device; and a process operating time summing section responsive to an output of said processing scheduling section to output a process operating time, said processing scheduling section storing a processing time estimated by said neural network device in an estimation column provided for manufacturing means along with a process code name, receiving a processing code name, name of manufacturing means and an actual processing time from said process operating time measurement section, and storing said .actual processing time in a result column of manufacturing means along with a processing code name while transmitting them to the selecting section for selecting process time for neural network learning, and said process operating time summing section outputting a summed operating time to said process program scheduling section.

20. A process time estimating apparatus as defined in claim 1, wherein said storage section transmits the input factor associated with a process code name transmitted from said selecting section for selecting process time to a learning means of said neural network device when said storage section receives a learning enable signal from said selecting section and deletes said input factor when said storage section receives a learning disable signal from said selecting section.

21. A process time estimating apparatus as defined in claim 20, wherein said input factors entered into an input layer of the neural network device includes drawing information, name of machine tool, name of metal die, and name of product, said neural network device outputting an estimated value of process time for manufacturing a metal die.

\* \* \* \* \*